United States Patent
de Juan, Jr. et al.

(10) Patent No.: US 10,191,303 B2
(45) Date of Patent: *Jan. 29, 2019

(54) MULTIFOCAL BIMODULUS CONTACT LENSES

(71) Applicant: NexisVision, Inc., Menlo Park, CA (US)

(72) Inventors: Eugene de Juan, Jr., San Francisco, CA (US); Cary J. Reich, Los Gatos, CA (US); Matt Clarke, Mountain View, CA (US); Kuangmon Ashley Tuan, Mountain View, CA (US); Raymond Lum, El Cerrito, CA (US); Jose D. Alejandro, Sunnyvale, CA (US)

(73) Assignee: NexisVision, Inc., Menlo Park, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 15/221,942

(22) Filed: Jul. 28, 2016

(65) Prior Publication Data

US 2016/0334640 A1    Nov. 17, 2016

Related U.S. Application Data

(63) Continuation of application No. PCT/US2015/013006, filed on Jan. 27, 2015.

(60) Provisional application No. 61/933,089, filed on Jan. 29, 2014.

(51) Int. Cl.
*G02C 7/04* (2006.01)

(52) U.S. Cl.
CPC .............. *G02C 7/049* (2013.01); *G02C 7/041* (2013.01); *G02C 7/044* (2013.01); *G02C 2202/06* (2013.01)

(58) Field of Classification Search
CPC ........... G02C 7/04; G02C 7/047; G02C 7/049
USPC .................................................... 351/159.23
See application file for complete search history.

(56) References Cited

U.S. PATENT DOCUMENTS

| | | |
|---|---|---|
| 2,641,161 A | 6/1953 | Silverstein |
| 3,246,941 A | 4/1966 | Moss |
| 3,488,111 A | 1/1970 | Isen |
| 3,489,491 A | 1/1970 | Creighton |
| 3,495,899 A | 2/1970 | Biri |
| 3,594,074 A | 7/1971 | Rosen |
| 3,619,044 A | 11/1971 | Kamath |
| 3,688,386 A | 9/1972 | Pereira |
| 3,833,786 A | 9/1974 | Brucker |
| 3,915,609 A | 10/1975 | Robinson |
| 3,944,347 A | 3/1976 | Barkdoll et al. |
| 3,973,837 A | 8/1976 | Page |
| 3,973,838 A | 8/1976 | Deichert et al. |
| 4,037,866 A | 7/1977 | Price |
| 4,053,442 A | 10/1977 | Jungr et al. |
| 4,068,933 A | 1/1978 | Seiderman |
| 4,071,272 A | 1/1978 | Drilik |
| 4,121,885 A | 10/1978 | Erickson et al. |
| 4,166,255 A | 8/1979 | Graham |
| 4,171,878 A | 10/1979 | Kivaev et al. |
| 4,194,815 A | 3/1980 | Trombley |
| 4,200,320 A | 4/1980 | Durham |
| 4,208,362 A | 6/1980 | Ceichert et al. |
| 4,211,476 A | 7/1980 | Brummel et al. |
| 4,268,133 A | 5/1981 | Fischer et al. |
| 4,312,575 A | 1/1982 | Peyman et al. |
| 4,381,007 A | 4/1983 | Doss |
| 4,487,905 A | 12/1984 | Mitchell |
| 4,593,981 A | 6/1986 | Scilipoti |
| 4,621,912 A | 11/1986 | Meyer |
| 4,640,594 A | 2/1987 | Berger |
| 4,666,249 A | 5/1987 | Bauman et al. |
| 4,666,267 A | 5/1987 | Wickterle |
| 4,701,288 A | 10/1987 | Cook et al. |
| 4,772,283 A | 9/1988 | White |
| 4,806,382 A | 2/1989 | Goldberg et al. |
| 4,810,082 A | 3/1989 | Abel, Jr. |
| 4,886,350 A | 12/1989 | Wichterle |
| 4,890,911 A | 1/1990 | Sulc et al. |
| 4,909,896 A | 3/1990 | Ikushima et al. |
| 4,940,751 A | 7/1990 | Frances et al. |
| 4,943,150 A | 7/1990 | Diechert et al. |
| 4,952,045 A | 8/1990 | Stoyan |

(Continued)

FOREIGN PATENT DOCUMENTS

| | | |
|---|---|---|
| CA | 993401 A1 | 7/1976 |
| CA | 2174967 C | 5/1995 |

(Continued)

OTHER PUBLICATIONS

Australian Examination Report for Application No. 2012249773, dated Jun. 23, 2016, 4 pages.
Canadian Examination Report for Application No. 2,816,031, dated Aug. 31, 2017, 3 pages.
Canadian Examination Report for Application No. 2,916,885, dated Jan. 24, 2017, 5 pages.
Examination Search Report for European Application No. 10825813.8, dated Feb. 20, 2017, 7 pages.
International Application No. PCT/US2014/065543, International Preliminary Report in Patentability dated May 17, 2016.

(Continued)

*Primary Examiner* — Darryl J Collins
(74) *Attorney, Agent, or Firm* — Sheppard Mullin Richter & Hampton LLP

(57) ABSTRACT

Bimodulus multifocal ophthalmic lenses for correcting presbyopia include an inner optic portion characterized by a rigidity greater than a rigidity of an outer peripheral portion. When applied to an eye, the ophthalmic lenses are configured to provide one or more lenticular volumes between the posterior surface of the lens and the cornea. The ophthalmic lenses are further characterized by features on a surface of the lens for improving multifocal visual acuity. The disclosure further relates to methods of correcting presbyopia using the ophthalmic lenses.

20 Claims, No Drawings

(56) References Cited

U.S. PATENT DOCUMENTS

| | | |
|---|---|---|
| 4,978,481 A | 12/1990 | Janssen et al. |
| 4,981,841 A | 1/1991 | Gibson |
| 4,997,583 A | 3/1991 | Itzhak |
| 5,008,289 A | 4/1991 | Bernstein |
| 5,073,021 A | 12/1991 | Marron |
| 5,104,213 A | 4/1992 | Wolfson |
| 5,143,660 A | 9/1992 | Hamilton et al. |
| 5,152,786 A | 10/1992 | Hanna |
| 5,159,360 A | 10/1992 | Stoy et al. |
| 5,166,710 A | 11/1992 | Hofer et al. |
| 5,191,365 A | 3/1993 | Stoyan |
| 5,213,720 A | 5/1993 | Civerchia |
| 5,236,236 A | 8/1993 | Girimont |
| 5,245,367 A | 9/1993 | Miller et al. |
| 5,246,259 A | 9/1993 | Hellenkamp et al. |
| 5,178,879 A | 11/1993 | Adekunle et al. |
| 5,293,186 A | 3/1994 | Seden et al. |
| 5,346,491 A | 9/1994 | Oertli |
| 5,347,326 A | 9/1994 | Volk |
| 5,349,395 A | 9/1994 | Stoyan |
| 5,397,848 A | 3/1995 | Yang et al. |
| 5,428,412 A | 6/1995 | Stoyan |
| 5,433,714 A | 7/1995 | Bloomberg |
| 5,433,898 A | 7/1995 | Thakrar et al. |
| 5,434,630 A | 7/1995 | Bransome |
| 5,472,436 A | 12/1995 | Fremstad |
| 5,496,084 A | 3/1996 | Miralles Medan |
| 5,517,260 A | 5/1996 | Glady et al. |
| 5,538,301 A | 7/1996 | Yavitz et al. |
| 5,570,144 A | 10/1996 | Lofgren-Nisser |
| 5,578,332 A | 11/1996 | Hamilton et al. |
| 5,598,233 A | 1/1997 | Haralambopoulos et al. |
| 5,612,432 A | 3/1997 | Taniguchi et al. |
| 5,628,794 A | 5/1997 | Lindstrom |
| 5,632,773 A | 5/1997 | Graham et al. |
| 5,649,922 A | 7/1997 | Yavitz |
| 5,662,706 A | 9/1997 | Legerton et al. |
| 5,671,038 A | 9/1997 | Porat |
| 5,712,721 A | 1/1998 | Large |
| 5,732,990 A | 3/1998 | Yavitz et al. |
| 5,757,458 A | 5/1998 | Miller et al. |
| 5,760,100 A | 6/1998 | Nicolson et al. |
| 5,760,870 A | 6/1998 | Payor et al. |
| 5,804,263 A | 9/1998 | Goldberg et al. |
| 5,820,624 A | 10/1998 | Yavitz |
| 5,854,291 A | 12/1998 | Laughlin et al. |
| 5,869,533 A | 2/1999 | Holt |
| 5,885,597 A | 3/1999 | Botknecht et al. |
| 5,905,561 A | 5/1999 | Lee et al. |
| 5,910,512 A | 6/1999 | Conant |
| 5,923,397 A | 7/1999 | Bonafini, Jr. |
| 5,929,968 A | 7/1999 | Cotie et al. |
| 5,953,098 A | 9/1999 | Lieberman et al. |
| 5,957,921 A | 9/1999 | Mirhashemi et al. |
| 5,962,532 A | 10/1999 | Campbell et al. |
| 5,971,541 A | 10/1999 | Danker et al. |
| 5,980,040 A | 11/1999 | Xu et al. |
| 5,986,001 A | 11/1999 | Ingenito et al. |
| 6,010,219 A | 1/2000 | Stoyan |
| 6,030,974 A | 2/2000 | Schwartz et al. |
| 6,036,314 A | 3/2000 | Wolfson et al. |
| 6,036,688 A | 3/2000 | Edwards |
| 6,048,855 A | 4/2000 | De Lacharriere et al. |
| 6,075,066 A | 6/2000 | Matsuda et al. |
| 6,092,898 A | 7/2000 | De Juan, Jr. |
| 6,099,121 A | 8/2000 | Chapman et al. |
| 6,217,171 B1 | 4/2001 | Auten et al. |
| 6,244,709 B1 | 6/2001 | Vayntraub et al. |
| 6,248,788 B1 | 6/2001 | Robbins et al. |
| 6,325,509 B1 | 12/2001 | Hodur et al. |
| 6,340,229 B1 | 1/2002 | Lieberman et al. |
| 6,361,169 B1 | 3/2002 | Tung |
| 6,364,482 B1 | 4/2002 | Roffman et al. |
| 6,406,145 B1 | 6/2002 | Jubin |
| 6,474,814 B1 | 11/2002 | Griffin |
| 6,520,637 B2 | 2/2003 | Hodur et al. |
| 6,541,028 B1 | 4/2003 | Kuri-Harcuch et al. |
| 6,551,307 B2 | 4/2003 | Peyman |
| 6,568,808 B2 | 5/2003 | Campin |
| 6,579,918 B1 | 6/2003 | Auten et al. |
| 6,593,370 B2 | 7/2003 | Tamura et al. |
| 6,652,095 B2 | 11/2003 | Tung |
| 6,659,607 B2 | 12/2003 | Miyamura et al. |
| 6,726,322 B2 | 4/2004 | Andino et al. |
| 6,726,684 B1 | 4/2004 | Woloszko et al. |
| 6,779,888 B2 | 8/2004 | Marmo |
| 6,843,563 B2 | 1/2005 | Richardson |
| 6,849,671 B2 | 2/2005 | Steffen et al. |
| 6,880,558 B2 | 4/2005 | Perez |
| 6,951,894 B1 | 10/2005 | Nicolson et al. |
| 7,018,039 B2 | 3/2006 | Legerton et al. |
| 7,025,455 B2 | 4/2006 | Roffman |
| 7,080,905 B2 | 7/2006 | Marmo et al. |
| 7,097,301 B2 | 8/2006 | Legerton et al. |
| 7,104,648 B2 | 9/2006 | Dahi et al. |
| 7,150,529 B2 | 12/2006 | Legerton et al. |
| 7,163,292 B2 | 1/2007 | Dahi et al. |
| 7,193,124 B2 | 3/2007 | Coffee |
| 7,216,974 B2 | 5/2007 | Meyers et al. |
| 7,249,849 B2 | 7/2007 | Marmo et al. |
| 7,270,412 B2 | 9/2007 | Legerton et al. |
| 7,322,694 B2 | 1/2008 | Dahi et al. |
| 7,329,001 B2 | 2/2008 | Benrashid et al. |
| 7,338,160 B2 | 3/2008 | Lieberman et al. |
| 7,360,890 B2 | 4/2008 | Back |
| 7,377,637 B2 | 5/2008 | Legerton et al. |
| 7,401,922 B2 | 7/2008 | Legerton |
| 7,404,638 B2 | 7/2008 | Miller et al. |
| 7,461,937 B2 | 12/2008 | Steffen et al. |
| 7,491,350 B2 | 2/2009 | Silvestrini |
| 7,530,689 B2 | 5/2009 | Berke |
| 7,537,339 B2 | 5/2009 | Legerton et al. |
| 7,543,936 B2 | 6/2009 | Legerton et al. |
| 7,559,649 B2 | 7/2009 | Cotie et al. |
| 7,585,074 B2 | 9/2009 | Dahi et al. |
| 7,594,725 B2 | 9/2009 | Legerton et al. |
| 7,628,810 B2 | 12/2009 | Christie et al. |
| 7,682,020 B2 | 3/2010 | Berke |
| 7,695,135 B1 | 4/2010 | Rosenthal |
| 7,699,465 B2 | 4/2010 | Dootjes et al. |
| 7,717,555 B2 | 5/2010 | Legerton et al. |
| 7,735,997 B2 | 6/2010 | Muckenhirn |
| 7,748,844 B2 | 7/2010 | Lai |
| 7,762,668 B2 | 7/2010 | Dai et al. |
| 7,828,432 B2 | 11/2010 | Meyers et al. |
| 7,859,769 B2 | 12/2010 | Zalevsky |
| 7,976,577 B2 | 7/2011 | Silvestrini |
| 7,984,988 B2 | 7/2011 | Berke |
| 8,137,344 B2 | 3/2012 | Jia et al. |
| 8,201,941 B2 | 6/2012 | Choo et al. |
| 8,459,793 B2 | 6/2013 | De Juan, Jr. et al. |
| 8,485,662 B2 | 7/2013 | Collins et al. |
| 8,591,025 B1 | 11/2013 | de Juan, Jr. |
| 8,678,584 B2 | 3/2014 | de Juan |
| 9,107,773 B2 | 8/2015 | de Juan, Jr. |
| 9,395,558 B2 | 7/2016 | de Juan, Jr. |
| 2002/0095199 A1 | 7/2002 | West, Jr. et al. |
| 2002/0164484 A1 | 11/2002 | Jiang et al. |
| 2004/0015163 A1 | 1/2004 | Buysse |
| 2004/0088050 A1 | 5/2004 | Norrby et al. |
| 2004/0141150 A1 | 7/2004 | Roffman et al. |
| 2004/0170666 A1 | 9/2004 | Keats et al. |
| 2004/0184158 A1 | 9/2004 | Shadduck |
| 2004/0212779 A1 | 10/2004 | Dahi et al. |
| 2005/0033420 A1 | 2/2005 | Christie et al. |
| 2005/0107775 A1 | 5/2005 | Huang et al. |
| 2005/0213030 A1 | 9/2005 | Meyers et al. |
| 2005/0259221 A1 | 11/2005 | Marmo |
| 2005/0288196 A1 | 12/2005 | Horn |
| 2006/0077581 A1 | 4/2006 | Schwiegerling |
| 2006/0083773 A1 | 4/2006 | Myung |
| 2006/0100617 A1 | 5/2006 | Boukhny |
| 2006/0132707 A1 | 6/2006 | Tung |
| 2006/0152673 A1 | 7/2006 | Cotie et al. |

(56) References Cited

U.S. PATENT DOCUMENTS

| | | |
|---|---|---|
| 2006/0197909 A1 | 9/2006 | Legerton |
| 2006/0197910 A1 | 9/2006 | Legerton |
| 2006/0235514 A1 | 10/2006 | Silvestrini |
| 2006/0238712 A1 | 10/2006 | Dahi |
| 2006/0241751 A1 | 10/2006 | Marmo |
| 2006/0250576 A1 | 11/2006 | Legerton et al. |
| 2006/0256283 A1 | 11/2006 | Legerton |
| 2006/0256284 A1 | 11/2006 | Dahi |
| 2006/0285071 A1 | 12/2006 | Erickson et al. |
| 2006/0285072 A1 | 12/2006 | Dahi et al. |
| 2006/0290882 A1 | 12/2006 | Meyers et al. |
| 2007/0013869 A1 | 1/2007 | Dahi |
| 2007/0014760 A1 | 1/2007 | Peyman |
| 2007/0037898 A1 | 2/2007 | Phelan et al. |
| 2007/0046894 A1 | 3/2007 | Muckenhirn |
| 2007/0106394 A1 | 5/2007 | Chen |
| 2007/0129720 A1 | 6/2007 | Demarias et al. |
| 2007/0132948 A1 | 6/2007 | Evans |
| 2007/0135915 A1 | 6/2007 | Klima |
| 2007/0182920 A1 | 8/2007 | Back et al. |
| 2007/0232755 A1 | 10/2007 | Matsushita et al. |
| 2007/0242216 A1 | 10/2007 | Dootjes et al. |
| 2007/0244559 A1 | 10/2007 | Shiuey |
| 2007/0273834 A1 | 11/2007 | Legerton |
| 2008/0039832 A1 | 2/2008 | Palanker et al. |
| 2008/0074611 A1 | 3/2008 | Meyers et al. |
| 2008/0100796 A1 | 5/2008 | Pruitt et al. |
| 2008/0243156 A1 | 10/2008 | John |
| 2008/0287915 A1 | 11/2008 | Rosenthal et al. |
| 2008/0291391 A1 | 11/2008 | Meyers et al. |
| 2009/0033864 A1 | 2/2009 | Shone et al. |
| 2009/0096987 A1 | 4/2009 | Lai et al. |
| 2009/0237612 A1 | 9/2009 | Cotie et al. |
| 2009/0244477 A1 | 10/2009 | Pugh et al. |
| 2009/0303434 A1 | 12/2009 | Tung |
| 2009/0303442 A1 | 12/2009 | Choo et al. |
| 2010/0036488 A1 | 2/2010 | De Juan, Jr. et al. |
| 2010/0060849 A1 | 3/2010 | Hibino |
| 2010/0128224 A1 | 5/2010 | Legerton |
| 2010/0157250 A1 | 6/2010 | Berke |
| 2010/0208196 A1 | 8/2010 | Benrashid et al. |
| 2010/0271589 A1 | 10/2010 | Legerton et al. |
| 2011/0034854 A1 | 2/2011 | Neuberger et al. |
| 2011/0071631 A1 | 3/2011 | Rosenthal |
| 2011/0208300 A1 | 8/2011 | De Juan, Jr. et al. |
| 2012/0105804 A1 | 5/2012 | Legerton |
| 2012/0113386 A1 | 5/2012 | Back |
| 2012/0169994 A1 | 7/2012 | Matsushita et al. |
| 2012/0310133 A1 | 12/2012 | De Juan, Jr. et al. |
| 2012/0327362 A1 | 12/2012 | Doraiswamy et al. |
| 2013/0025606 A1 | 1/2013 | De Juan, Jr. et al. |
| 2013/0066283 A1 | 3/2013 | De Juan, Jr. et al. |
| 2013/0070200 A1 | 3/2013 | De Juan, Jr. et al. |
| 2013/0077044 A1 | 3/2013 | De Juan, Jr. et al. |
| 2013/0201442 A1 | 8/2013 | Back |
| 2013/0201443 A1 | 8/2013 | Back et al. |
| 2013/0201454 A1 | 8/2013 | Back |
| 2013/0208236 A1 | 8/2013 | McCabe et al. |
| 2013/0208237 A1 | 8/2013 | Hawke et al. |
| 2013/0222761 A1 | 8/2013 | Hansen et al. |
| 2013/0242255 A1 | 9/2013 | Caldarise et al. |
| 2013/0258276 A1 | 10/2013 | Hansen et al. |
| 2013/0278890 A1 | 10/2013 | de Juan et al. |
| 2013/0293832 A1 | 11/2013 | de Juan et al. |
| 2014/0028979 A1 | 1/2014 | de Juan et al. |
| 2014/0043588 A1 | 2/2014 | Grant et al. |
| 2014/0069438 A1 | 3/2014 | de Juan et al. |
| 2014/0069439 A1 | 3/2014 | de Juan et al. |
| 2014/0155800 A1 | 6/2014 | de Juan et al. |
| 2014/0251347 A1 | 9/2014 | de Juan et al. |
| 2014/0362338 A1 | 12/2014 | de Juan et al. |
| 2015/0055081 A1 | 2/2015 | de Juan et al. |
| 2015/0077701 A1 | 3/2015 | de Juan et al. |
| 2016/0067109 A1 | 3/2016 | de Juan et al. |
| 2016/0180233 A1 | 6/2016 | de Juan et al. |
| 2016/0223835 A1 | 8/2016 | de Juan et al. |
| 2017/0023800 A1 | 1/2017 | De Juan, Jr. et al. |
| 2017/0131566 A1 | 5/2017 | De Juan, Jr. et al. |
| 2017/0315380 A1 | 11/2017 | De Juan, Jr. et al. |
| 2017/0315381 A1 | 11/2017 | De Juan, Jr. et al. |

FOREIGN PATENT DOCUMENTS

| | | |
|---|---|---|
| DE | 3143839 A1 | 5/1983 |
| EP | 0042679 A2 | 12/1981 |
| EP | 0434205 A2 | 6/1991 |
| EP | 0574352 A1 | 12/1993 |
| EP | 0590772 | 4/1994 |
| EP | 0378512 A3 | 2/1995 |
| EP | 0378512 B1 | 2/1995 |
| EP | 0683416 A1 | 11/1995 |
| EP | 0985157 B1 | 12/1998 |
| EP | 1496388 | 1/2005 |
| EP | 1664907 A1 | 6/2006 |
| FR | 2330025 A1 | 5/1977 |
| GB | 2107895 A | 5/1983 |
| JP | 52-78453 | 7/1977 |
| JP | S55101125 U | 7/1980 |
| JP | S5727456 Y2 | 6/1982 |
| JP | S5727457 Y2 | 6/1982 |
| JP | 59-43931 | 3/1984 |
| JP | 2661909 B2 | 10/1997 |
| JP | H11151263 A | 6/1999 |
| JP | H11249048 A | 9/1999 |
| JP | 2003-107411 | 4/2003 |
| JP | 2004504105 A | 2/2004 |
| JP | 2004-510199 | 4/2004 |
| JP | 2009-098457 | 5/2009 |
| WO | 199014083 A1 | 11/1990 |
| WO | 199207617 A1 | 5/1992 |
| WO | 199307840 A1 | 4/1993 |
| WO | 199405225 A1 | 3/1994 |
| WO | 94/29756 | 12/1994 |
| WO | 199513764 A1 | 5/1995 |
| WO | 199515134 A1 | 6/1995 |
| WO | 199627816 A1 | 9/1996 |
| WO | 199719381 A1 | 5/1997 |
| WO | 199803267 A1 | 1/1998 |
| WO | 199854603 A1 | 12/1998 |
| WO | 199930560 A1 | 6/1999 |
| WO | 199943354 A2 | 9/1999 |
| WO | 199943354 A3 | 9/1999 |
| WO | 199946631 A1 | 9/1999 |
| WO | 200009042 A1 | 2/2000 |
| WO | 200168082 A1 | 9/2001 |
| WO | 200206883 A2 | 1/2002 |
| WO | 200210841 A1 | 2/2002 |
| WO | 2002068008 A1 | 9/2002 |
| WO | 2003097759 A1 | 11/2003 |
| WO | 2004068196 A1 | 8/2004 |
| WO | 2004097502 A1 | 11/2004 |
| WO | 2004109368 A2 | 12/2004 |
| WO | 2005079290 A2 | 9/2005 |
| WO | 2005116729 A2 | 12/2005 |
| WO | 2006026666 A2 | 3/2006 |
| WO | 2006026666 A3 | 3/2006 |
| WO | 2006121591 A1 | 11/2006 |
| WO | 2006134649 A1 | 12/2006 |
| WO | 2007002231 A1 | 1/2007 |
| WO | 2007044513 A1 | 4/2007 |
| WO | 2007053297 A2 | 5/2007 |
| WO | 2007053297 A3 | 5/2007 |
| WO | 2009065061 A1 | 5/2009 |
| WO | 2009073213 A1 | 6/2009 |
| WO | 2006113149 A2 | 10/2009 |
| WO | 2006113149 A3 | 10/2009 |
| WO | 2009145842 A2 | 12/2009 |
| WO | 2010051172 A1 | 5/2010 |
| WO | 2010144317 A1 | 12/2010 |
| WO | 2011050327 A1 | 4/2011 |
| WO | 2011050365 A1 | 4/2011 |
| WO | 2012061160 A1 | 5/2012 |

(56) References Cited

FOREIGN PATENT DOCUMENTS

| WO | 2012149056 A1 | 11/2012 |
| WO | 2011/004800 | 12/2012 |
| WO | 2013184239 A1 | 12/2013 |

OTHER PUBLICATIONS

Non-Final Office Action for U.S. Appl. No. 15/096,442, dated Dec. 28, 2016, 16 pages.
Non-Final Office Action for U.S. Appl. No. 12/384,659, dated May 30, 2017, 5 pages.
Non-Final Office Action for U.S. Appl. No. 13/503,841, dated Mar. 1, 2017, 12 pages.
Non-Final Office Action for U.S. Appl. No. 15/184,922, dated Jun. 2, 2017, 22 pages.
Final Office Action for U.S. Appl. No. 14/061,311, dated Mar. 9, 2017, 16 pages.
Non-Final Office Action for U.S. Appl. No. 14/468,075, dated Nov. 7, 2016.
Non-Final Office Action for U.S. Appl. No. 14/966,918, dated Nov. 18, 2016.
Non-Final Office Action for U.S. Appl. No. 14/173,516, dated Feb. 8, 2017, 11 pages.
Non-Final Office Action for U.S. Appl. No. 15/253,183, dated Nov. 3, 2017, 7 pages.
Extended European Search Report for EP Application No. 17183160.5, dated Sep. 12, 2017, 6 pages.
Alio, Jorge L. et al. "Contact lens fitting to correct irregular astigmatism after corneal refractive surgery," Journal of Cataract & Refractive Surgery, vol. 28, No. 10, pp. 1750-1757, Oct. 2002.
Bausch & Lomb Inc., Boston® Materials & Solutions: Product Guide, 2009.
Bissen-Miyajima, Hiroko et al., "Role of the endothelial pump in flap adhesion after laser in situ keratomileusis," Journal of Cataract & Refractive Surgery, vol. 30, No. 9, pp. 1989-1992, Sep. 2004.
Schimmelpfenning, B. et al., "A technique for controlled sensory denervation of the rabbit cornea," Database Accession No. NLM7129102, Graefe's Archive for Clinical and Experimental Opthalmology, vol. 218, No. 6, pp. 287-293, Jun. 1982 (abstract only).
SynergEyes, Inc., "SynergEyes® A Practitioner Training," Mar. 2011, retrieved from the Internet at <http://www.fitsynergeyes.com/syn_a/synergeyesA_presentation.pdf>.
SynergEyes, Inc., "SynergEyes® A," package insert, P/N 70008 Rev. I, Oct. 2008.
SynergEyes®, Inc., Product Overview of Clearkone® and Synergeyes® PS, retrieved from the Internet at http://www.synergeyes.com/index.html on May 29, 2012.
European Patent Application No. 10825787.4, Examination Report dated Aug. 12, 2014.
European Patent Application No. 10825787.4, Search Report dated Jun. 18, 2013.
European Patent Application No. 98936282.7, Examination Report dated Mar. 26, 2004.
International Application No. PCT/US2009/002166, International Preliminary Report on Patentability dated Oct. 5, 2010.
International Application No. PCT/US2009/002166, International Search Report and Written Opinion dated Nov. 19, 2009.
International Application No. PCT/US2010/053854, International Preliminary Report on Patentability dated Apr. 24, 2012.
International Application No. PCT/US2010/053854, International Search Report and Written Opinion dated Mar. 1, 2011.
International Application No. PCT/US2010/053975, International Preliminary Report on Patentability dated Apr. 24, 2012.
International Application No. PCT/US2010/053975, International Search Report and Written Opinion dated Feb. 11, 2011.
International Application No. PCT/US2011/057755, International Search Report dated Feb. 7, 2012.
International Application No. PCT/US2012/035050, International Search Report and Written Opinion dated Oct. 3, 2012.
International Application No. PCT/US2013/037219, International Search Report and Written Opinion dated Sep. 30, 2013.
International Application No. PCT/US2013/059244, International Search Report and Written Opinion dated Nov. 26, 2013.
International Application No. PCT/US2014/044136, International Search Report and Written Opinion dated Jan. 16, 2015.
International Application No. PCT/US2014/064391, International Search Report and Written Opinion dated Jan. 26, 2015.
International Application No. PCT/US2014/065543, International Search Report and Written Opinion dated Feb. 25, 2015.
International Application No. PCT/US2015/013006, International Search Report and Written Opinion dated Apr. 2, 2015.
Japanese Patent Application No. 2011-502997, Office Action dated Jun. 14, 2013.
Japanese Patent Application No. 2011-502997, Office Action dated Mar. 3, 2014.
U.S. Appl. No. 12/384,659, Non-Final Office Action dated Jan. 21, 2016.
U.S. Appl. No. 13/456,168, Non-Final Office Action dated Sep. 12, 2013.
U.S. Appl. No. 13/456,168, Notice of Allowance dated May 30, 2014.
U.S. Appl. No. 13/503,841, Final Office Action dated Nov. 26, 2014.
U.S. Appl. No. 13/503,841, Non-Final Office Action dated Jun. 27, 2014.
U.S. Appl. No. 13/503,841, Non-Final Office Action dated Nov. 16, 2015.
U.S. Appl. No. 13/503,841, Final Office Action dated Jun. 9, 2016.
U.S. Appl. No. 13/503,842, Final Office Action dated Aug. 13, 2014.
U.S. Appl. No. 13/503,842, Non-Final Office Action dated Apr. 3, 2014.
U.S. Appl. No. 13/503,842, Non-Final Office Action dated Nov. 25, 2015.
U.S. Appl. No. 13/503,842, Notice of Allowance dated Jul. 11, 2016.
U.S. Appl. No. 13/555,056, Final Office Action dated Sep. 5, 2014.
U.S. Appl. No. 13/555,056, Non-Final Office Action dated Mar. 28, 2014.
U.S. Appl. No. 13/615,111, Notice of Allowance dated Apr. 23, 2013.
U.S. Appl. No. 13/715,917, Notice of Allowance dated Aug. 1, 2013.
U.S. Appl. No. 13/865,780, Notice of Allowance dated Mar. 28, 2016.
U.S. Appl. No. 13/885,135, Non-Final Office Action dated Nov. 18, 2014.
U.S. Appl. No. 13/885,135, Notice of Allowance dated Mar. 16, 2016.
U.S. Appl. No. 13/894,176, Non-Final Office Action dated Aug. 5, 2013.
U.S. Appl. No. 13/894,176, Notice of Allowance dated Feb. 26, 2014.
U.S. Appl. No. 13/928,077, Notice of Allowance dated Jan. 15, 2014.
U.S. Appl. No. 14/061,311, Non-Final Office Action dated Apr. 21, 2016.
U.S. Appl. No. 14/286,605, Non-Final Office Action dated Dec. 18, 2014.
U.S. Appl. No. 14/468,075, Final Office Action dated Apr. 1, 2016.
U.S. Appl. No. 14/532,707, Non-Final Office Action dated Feb. 25, 2016.
U.S. Appl. No. 14/532,707, Notice of Allowance dated Jun. 8, 2016.
U.S. Appl. No. 14/532,732, Non-Final Office Action dated Apr. 11, 2016.
U.S. Appl. No. 14/532,732, Final Office Action dated Oct. 3, 2016.
U.S. Appl. No. 14/539,698, Notice of Allowance dated Jan. 21, 2016.
U.S. Appl. No. 14/793,965, Non-Final Office Action dated Dec. 31, 2015.

MULTIFOCAL BIMODULUS CONTACT LENSES

This application is a continuation of PCT International Application No. PCT/US2015/013006 filed on Jan. 27, 2015, which claims the benefit of U.S. Provisional Application No. 61/933,089 filed on Jan. 29, 2014, each of which is incorporated by reference in its entirety.

FIELD

This disclosure relates to bimodulus multifocal ophthalmic lenses for correcting presbyopia. Ophthalmic lenses include an inner optic portion configured so that engagement of the posterior surface of the ophthalmic lens against the eye deforms the posterior surface and so that the posterior surface has a shape diverging from the refractive shape of the cornea. The posterior surface can partially conform to the surface of the cornea to provide one or more lenticular volumes. The ophthalmic lenses are characterized by an inner optic portion having a rigidity greater than that of an outer peripheral portion. One or more of the anterior surface and posterior surface of a bimodulus lens includes features for correcting presbyopia, which may include refractive optics, diffractive optics, or a combination of both refractive and diffractive optics for correcting presbyopia.

BACKGROUND

Hybrid or bimodular contact lenses, lenses having a comparatively rigid central portion and a soft skirt can be used to correct refractive error of the eye such as astigmatism. Current products such as rigid gas permeable (RGP) and soft toric lenses for correcting refractive error include a cylindrical component in addition to any spherical corrective component that must be determined for each patient and oriented with respect to the optical region of the cornea to maintain optimal vision correction. Features are incorporated into the lens to maintain centration and radial orientation of the lens of the eye during wear. Because of the need to fit and orient the cylindrical corrective component, a large number of lenses must be maintained in inventory and individually fit and selected for each patient.

Presbyopia normally develops as a person ages, and is associated with a natural progressive loss of accommodation. A presbyopic eye often loses the ability to rapidly and easily refocus on objects at varying distances. The effects of presbyopia usually become noticeable after the age of 45 years. By the age of 65 years, the crystalline lens has often lost almost all elastic properties and has only a limited ability to change shape. Presbyopes are projected to be the single largest group of potential contact lens wearers within the next few years. However, contact lens usage decreases after around age 45 when many patients begin to need multifocal correction for presbyopia. Current multifocal contact lenses for presbyopia correction are designed to extend depth of focus with minimal reduction in image quality. However, an underlying astigmatic error can limit the overall performance of multifocal optics. For example, corneal toricity can distort soft multifocal contact lenses leading to image degradation.

Thus, there is a need for contact lenses, and in particular soft contact lenses that treat presbyopia and accommodate astigmatic error.

SUMMARY

Bimodulus soft contact lenses can be combined with multi-focal optics to address presbyopia and correct for astigmatic error.

In a first aspect, ophthalmic lens for correcting presbyopia of an eye are provided, the eye having a cornea characterized by a refractive shape extending across an optical region of the cornea, the ophthalmic lens comprising: an inner optic portion and a peripheral portion disposed radially outward of the inner optic portion, wherein, the inner optic portion is configured to be disposed over the optical region of the cornea; the inner optic portion is characterized by an inner rigidity the peripheral portion is characterized by a peripheral rigidity; the inner rigidity is greater than the peripheral rigidity; and the inner rigidity is from about 1E8 MPa-$\mu m^3$ to about 1E11 MPa-$\mu m^3$; and an anterior surface and a posterior surface opposite the anterior surface, wherein, a portion of the anterior surface is configured to correct presbyopia; and the posterior surface extending along the inner optic portion and is configured so that engagement of the posterior surface against the eye deforms the posterior surface of the lens and so that the posterior surface extending along the inner optic portion has a shape diverging from the refractive shape of the cornea.

In a second aspect, methods for correcting presbyopia of an eye are provided, the eye having a cornea with a refractive shape extending across an optical region of the cornea, the method comprising: positioning an ophthalmic lens on the eye so that an inner optic portion of the ophthalmic lens is disposed over the optical region of the cornea, wherein at least a portion of a posterior surface of the positioned ophthalmic lens extends adjacent the eye and is deformed by the eye; and wherein a shape of the posterior surface diverges from the refractive shape of the cornea so that the ophthalmic lens mitigates the presbyopia and mitigates refractive error.

DETAILED DESCRIPTION

As used herein, mathematical equations and scientific notation can be used to identify values in many ways understood by a person of ordinary skill in the art, for example so as to express data in accordance with notations used in many commercially available spreadsheets such as Excel™. As used herein the symbol "E" can be used to express an exponent in base 10, such that 1E1 equals about 10, 2E1 equals about 20, and 4E2 equals about 400. As used herein the symbol "^" can be used to express an exponent, such that A^B equals $A^B$. Units can be expressed in many ways and as would be understood by a person of ordinary skill in the art, for example "m" as meters, "Pa" as the Pascal unit for pressure, "MPa" as Mega Pascal.

As used herein, an on K fit of a lens such as a contact lens encompasses fitting the contact lens to the flattest meridian of the cornea and the on K fit can be flatter than the flattest meridian within about 1.5 D. For example, for a cornea having keratometer values (hereinafter "K's") of about 44D axis 90 and 43D axis 180, the on K fit would provide a lens having a curvature corresponding to an optical power within a range from about 43D to about 41.5 D for the region of the eye measured. The on K fit can allow for tear liquid to form under the lens such that the tear liquid can be pumped in accordance with embodiments as described herein.

The optical power of the cornea in Diopters ("D") can be related to the radius R of curvature of the cornea with the formula D=(1.3375−1)/R, where 1.3375 corresponds to the index of refraction of the tear fluid. The curvature of the cornea is inversely related to the radius of curvature R such that as the radius of curvature increases the curvature of the cornea decreases and such that as the radius of curvature decreases, the curvature of the cornea increases.

Dk as used herein has its ordinary meaning as known to those skilled in the art and refers to oxygen permeability, i.e., the amount of oxygen passing through a lens such as a contact lens over a given period of time and pressure difference conditions. Dk is express in units of $10^{-11}$ (cm/sec)(mL $O_2$)(mL×mm Hg), also known as a barrer. Oxygen transmissibility can be expressed as Dk/t, where t is that thickness of the structure such as a contact lens and therefore Dk/t represents the amount of oxygen passing through a contact lens of a specified thickness over a given set of time and pressure difference conditions. Oxygen transmissibility has the units of barrers/cm or $10^{-9}$ (cm/sec)(mL $O_2$)(mL×mm Hg).

As used herein the terms outer portion of a lens and peripheral portion of a lens are used interchangeably. The outer or peripheral portion is disposed radially around and connected to the inner portion of a covering or lens. In general, the outer or peripheral portion tapers from a thickness at the interface with the inner portion toward the outer or peripheral edge of the covering or lens. The outer or peripheral portion may be further characterized by sub-portions characterized by, for example, different radii of curvature, thickness, rigidity, and material. The sub-portions may be configured radially around the center optic portion. Furthermore, the outer or peripheral portion is typically disposed outside the optical region of the cornea with the covering or lens centered on the cornea of an eye. The inner portion is also referred to herein as the inner or optical component or button. The outer portion is also referred to herein as the outer or coupling component.

Contact lenses provided by the present disclosure provide presbyoptic correction. Contact lenses comprise a deformable inner optic portion having a higher rigidity than an outer portion to facilitate correction of astigmatic error of the eye. Using such bimodulus contact lenses as a platform, features for correcting presbyopia can be included. A bimodulus multifocal contact lens provided by the present disclosure provides presbyoptic correction and by correcting for astigmatic error, improves visual acuity for a patient having both astigmatic and presbyoptic error.

Bimodulus Contact Lenses—Astigmatic Correction

Bimodulus contact lenses for correcting astigmatic error are disclosed, for example, in U.S. Application Publication No. 2013/0077044, U.S. Application Publication No. 2013/0278890, U.S. Provisional Application No. 61/900,947 filed on Nov. 6, 2013, and U.S. Provisional Application No. 61/904,992 filed on Nov. 15, 2013, each of which is incorporated by reference in its entirety. A bimodulus lens is characterized by a deformable inner optic portion having a higher rigidity than an outer peripheral portion. When applied to an eye of a patient the inner optic portion deforms to conform to at least a portion of the cornea and is sufficiently rigid to span non-spherical portions of the cornea to form a lenticular volume between the posterior surface of the lens and the anterior surface of the cornea. The lenticular volume forms a tear lens that corrects astigmatic error of the eye regardless of the radial orientation of the contact lens with respect to the cornea.

Bimodulus contact lenses for correcting astigmatic error can be characterized by a deformable inner optic portion having a higher rigidity than a peripheral portion.

The rigidity of the inner optic portion can be determined by the thickness of the inner optic portion and the one or more materials forming the inner optic portion. The inner optic portion may comprise a single material or more than one material. In certain embodiments, one or more of the materials forming the inner optic portion may be characterized by a different cross-sectional thickness and/or by a different modulus. In certain embodiments, an inner optic portion may comprise different layers of materials through the cross-sectional thickness of the inner optic portion. For example, the inner optic portion may comprise a layer of a first material disposed toward the anterior portion of the lens and a second material disposed toward the posterior portion of the lens. The first material and the second material may be characterized by different thicknesses and different moduli. In another embodiment, an inner optic portion may comprise a sandwich structure of a first layer disposed toward the anterior surface, a second layer disposed toward the posterior surface, and a third layer disposed between the first and second layers. One or more of the first layer, second layer, and third layer may be characterized by a different thickness and a material having a different moduli. For example, in certain embodiments, an inner optic portion may have a layer comprising a material having a higher modulus between an anterior layer and a posterior layer formed from materials having a lower modulus.

Regardless of the specific design, the dimensions and materials of the inner optic portion can be selected to facilitate symmetrically independent correction of astigmatic error. To provide symmetrically independent correction of astigmatic error the inner optic portion of the lens can be configured to partially conform to the surface of the cornea. In certain embodiments, the inner optic portion can be configured to partially conform to spherical surfaces of the cornea and to span non-spherical portions such that a lenticular volume is formed between the posterior surface of the inner optic portion and the underlying non-spherical portions of the cornea. The lenticular volume is configured to fill with tear fluid to thereby form a tear lens and provide a radially symmetric spherical surface for correcting astigmatic error.

Bimodulus Lenses

In certain embodiments, a bimodulus lens comprises an inner optical component for vision, such as a lens, and an outer coupling component to hold the inner component in relation to the pupil to improve vision. The coupling component may comprise a deflectable material that inhibits passage of tear liquid through the material such that the tear liquid passes through fenestrations when the eye blinks and an eyelid exerts pressure on the optical component. The outer coupling component may comprise fenestrations to pass the tear liquid and the outer sclera-coupling portion to contact the conjunctiva. The optical component may comprise a first material characterized by a first modulus and first thickness corresponding to a first rigidity. The coupling component may comprise a second material characterized by a second modulus and a second thickness corresponding to a second rigidity. The second material can be softer, e.g., have a lower modulus, than that of the first material and the second thickness can be less than the first thickness such that the coupling component can be deflected with the eyelid, and such that the coupling component can be deflected by an amount greater than the optical component when the eyelids close to cover the first component and the second component. The optical component can be more rigid than the coupling component, such that the optical component can provide vision when the outer portion is deflected by one or more eyelids. In certain embodiments, the optical component is configured to have sufficient rigidity to maintain a lenticular volume between the posterior surface of the lens and the cornea.

A lens may comprise one or more of many optically clear materials, for example synthetic materials or natural materials such as collagen-based materials, and combinations thereof, such as described in U.S. Application Publication No. 2010/0036488. For example, a lens may comprise a naturally occurring material, such as collagen-based material. Alternatively or in combination, a lens material may comprise a known synthetic material, for example hydroxyethyl methacrylate (HEMA) hydrogel, hydrogel, silicone hydrogel, silicone, for example hydrated silicone and derivatives thereof. For example, the optically clear material may comprise one or more of silicone, silicone hydrogel, silicone comprising resin, silicone comprising silicate, acrylate, collagen, or a combination of any of the foregoing. The cured silicone may comprise silicone that is two-part, heat-curable and RTV (room temperature vulcanized). For example, polydimethyl siloxane such as NuSil, or poly(dimethyl) (diphenyl) siloxane may be used to mold the lens, for example with less than 10% water content so as to increase oxygen diffusion through the lens. A lens may comprise perfluoropolyethers or fluorofocal. The material may comprise, for example, silicone elastomer having optically clear silicate disposed therein and a water content of no more than about 10%, for example no more than about 5%, or no more than about 1%, such that the lens has a very high Dk exceeding $150 \times 10^{-11}$ and in certain embodiments exceeding $300 \times 10^{-11}$, and the silicone lens comprising silicate can be treated to provide a wettable surface. A lens may comprise hydrogel, for example silicone hydrogel, or silicone and can be formed with a water content within a range from about 5% to about 35% and a modulus within a range or a combination of ranges from about 0.1 MPa to about 40 MPa, such that the lens conforms at least partially to the anterior surface of the cornea. In certain embodiments, lenses provided by the present disclosure do not contain water and provide a barrier for the flow of fluid across the lens. For example, when applied to the cornea, lenses minimize or prevent the flow of fluid from the cornea and the flow of fluid such as tea fluid from the outer surface of the lens to the cornea. The lenses provide a fluid seal and the material or materials forming a lens are selected to minimize or prevent moisture transport across the lens thickness.

In certain embodiments, the materials forming lenses provided by the present disclosure are characterized by a high oxygen permeability (Dk, cm$^2$·mL O$_2$/sec·mL·mm Hg) such as from $100 \times 10^{-11}$ to $500 \times 10^{-11}$, from $200 \times 10^{-11}$ to $500 \times 10^{-11}$, from $250 \times 10^{-11}$ to $450 \times 10^{-11}$, from $300 \times 10^{-11}$ to $400 \times 10^{-11}$, and in certain embodiments, about 350. In certain embodiments, lenses provided by the present disclosure are characterized by a high oxygen permeability (Dk) such as at least about $250 \times 10^{-11}$, at least about $300 \times 10^{-11}$, at least about $350 \times 10^{-11}$, and in certain embodiments, at least about $400 \times 10^{-11}$.

A lens may comprise silicone or silicone hydrogel having a low ionoporosity. For example, a lens may comprise silicone hydrogel or silicone comprising a low ion permeability, and the range of water can be from about 5% to about 35%, such that the Dk is $100 \times 10^{-11}$ or more. In certain embodiments, the low ion permeability may comprise an Ionoton Ion Permeability Coefficient of no more than about $0.25 \times 10^{-3}$ cm$^2$/sec, for example no more than about $0.08 \times 10^{-3}$ cm$^2$/sec. In certain embodiments, the low ion permeability comprises an Ionoton Ion Permeability Coefficient of no more than about $2.6 \times 10^{-6}$ mm$^2$/min, for example no more than about $1.5 \times 10^{-6}$ mm$^2$/min.

A lens may comprise a wettable surface coating disposed on at least the upper side (anterior surface) of the lens, such that the tear film of the patient is smooth over the lens and the patient can see. The wettable surface coating may comprise a lubricious coating for patient comfort, for example to lubricate the eye when the patient blinks. The wettable coating may comprise a contact angle no more than about 80 degrees. For example, the coating may comprise a contact angle no more than about 70 degrees, and the contact angle can be within a range from about 55 degrees to 65 degrees to provide a surface with a smooth tear layer for vision. For example, the wettable coating can be disposed on both an upper surface and a lower surface of the lens. The upper surface may comprise a wettable coating extending over at least the inner optic portion.

A wettable coating may comprise one or more of many suitable materials. For example, a wettable coating may comprise polyethylene glycol (PEG), and the PEG coating can be disposed on Parylene™. Alternatively, a wettable coating may comprise a plasma coating, and the plasma coating may comprise a luminous chemical vapor deposition (LCVD) film. For example, the plasma coating comprises at least one of a hydrocarbon, for example CH$_4$, O$_2$ or fluorine-containing hydrocarbon, for example CF$_4$ coating. Alternatively or in combination, the wettable coating may comprise a polyethylene glycol (PEG) coating or 2-hydroxyethylmethacrylate (HEMA). For example, the wettable coating may comprise HEMA disposed on a Parylene™ coating, or the wettable coating may comprise N-vinylpyrrolidone (NVP) disposed on a Parylene™ coating.

In certain embodiments, methods for selecting ophthalmic lenses are provided. The methods may be used to correct a refractive error of an eye of a patient, the eye having a cornea with a refractive shape. In certain embodiments, methods for selecting ophthalmic lenses comprise determining a desired spherical power so as to mitigate any spherical component of the refractive error of the eye of the patient; and identifying, from among a plurality of alternative ophthalmic lenses having differing spherical powers, the ophthalmic lens corresponding to the desired spherical power. The identified ophthalmic lens may then be selected and applied to the eye of the patient to correct the spherical refractive error. The identified ophthalmic lens can have an anterior surface corresponding to a desired optical power, and the anterior surface extends along an inner portion of the ophthalmic lens.

The ophthalmic lenses can have an inner portion for correcting spherical refractive error and a peripheral portion for contacting an optical tissue. The inner portion of the ophthalmic lens can be deformable and the peripheral portion of the ophthalmic lens can be deformable. The inner portion of the ophthalmic lens can have a modulus and a rigidity that is higher than the modulus and the rigidity of the peripheral portion. The peripheral portion of the ophthalmic lens has a shape suitable for engaging the eye outside the optical region so as to support the inner portion in alignment with an optical region of the eye. In certain embodiments, the peripheral portion is configured to engage a tissue of the eye such as the epithelium and to prevent or minimize motion of the ophthalmic lens with respect to the optical region of the eye. In certain embodiments, the inner portion, the peripheral portion, or both the inner and peripheral portions may deform or deflect upon blinking of the eye.

In certain embodiments, the refractive shape of the epithelium and cornea extends across the optical region of the eye such that the refractive error comprises astigmatism and/or a high-order optical aberration. In such embodiments, the posterior surface extending across the optical region adjacent the eye may or may not comprise a refractive shape so as to mitigate the astigmatism and/or high-order aberration. Selection of a desired ophthalmic lens can be performed so that the peripheral portion of the ophthalmic lens has a suitable shape to maintain a lenticular volume between the posterior surface of the ophthalmic lens and the surface of the eye such as the epithelium. Before, during, and/or following positioning of the ophthalmic lens on the eye, the lenticular volume fills with tear fluid such that the anterior shape of the ophthalmic lens corrects the refractive error. Accordingly, in certain methods, selecting an ophthalmic lens is performed so that the peripheral portion has a suitable shape such that tear fluid will fill a lenticular volume between the posterior surface and the refractive shape of the eye so as to mitigate the astigmatism and/or high-order aberration. Where tear fluid is disposed between the contact lens and the eye, and where the lens is characterized by a refractive index sufficiently close to that of the tear fluid, the refraction of the eye may be largely independent of the shape the posterior surface and/or lenticular volume, at least when the posterior surface initially contacts the lens and/or the contact lens remains disposed on the eye. In certain methods, identifying an ophthalmic lens is independent of at least one member of the group a power of the astigmatism; and orientation of the astigmatism about an optical axis of the eye, and/or as strength of the high-order aberration and/or a type of high-order aberration. As a consequence, of the lenticular volume as defined by posterior surface of the eye and the refractive shape being filled with tear fluid, it is not necessary to orient an axis or position of the ophthalmic lens with the eye.

Ophthalmic lenses provided by the present disclosure may also be used for treating presbyopia. Methods for treating presbyopia comprise, for example, positioning an ophthalmic lens on an eye so that an inner portion of the ophthalmic lens is disposed over the optical region of the cornea of the eye, and supporting the inner portion of the ophthalmic lens by engagement between a peripheral portion of the ophthalmic lens and a tissue of the eye outside the optical region. The inner portion of the ophthalmic lens and the peripheral portion of the ophthalmic lens can be deformable such that the inner portion has a modulus and rigidity that is greater than the modulus and rigidity of the peripheral portion. To correct for presbyopia, the inner portion comprises a presbyopia-mitigating shape. In certain embodiments, a presbyopia-mitigating shape is selected from an add region, a multifocal shape, an aspherical shape, and a combination of any of the foregoing. In certain embodiments, the peripheral portion comprises one or more radius of curvature configured to engage a tissue of the eye such as the epithelium so as to prevent or minimize motion of the inner portion with respect to the optical region of the cornea. The anterior portion of ophthalmic lens and the posterior surface of the eye can define one or more lenticular volumes that are configured to fill with tear fluid. To facilitate filling and/or flow of the tear fluid a plurality of fenestrations extending through the thickness of the peripheral region may be disposed in the peripheral region. The fenestrations can be disposed to facilitate, in conjunction with motion of the ophthalmic lens, transfer of tear fluid through the lenticular volume. Such methods of treating presbyopia using an ophthalmic lens provided by the present disclosure may not require precise alignment such as rotational alignment of the ophthalmic lens with respect to the eye.

Similarly, methods for correcting a refractive error of an eye, such as astigmatism and/or spherical aberration, where the eye has a cornea with a refractive shape extending across an optical region of the eye are also provided. Methods for correcting a refractive error comprise positioning an ophthalmic lens on the eye so that an inner portion of the ophthalmic lens is disposed over the optical region of the cornea, wherein a posterior surface of the positioned ophthalmic lens extends adjacent the eye and has a shape diverging from the refractive shape of the epithelium so that one or more lenticular volumes are disposed between the posterior surface and the epithelium. A peripheral portion of the ophthalmic lens may comprise a plurality of fenestrations extending through the thickness of the peripheral portion and allowing passage of tear fluid between the lenticular volume and the posterior (inner) surface of the ophthalmic lens. In such embodiments, the inner portion of the positioned ophthalmic lens is supported by engagement of a peripheral portion of the ophthalmic lens and a tissue of the eye such as the epithelium outside the optical region. The peripheral portion is configured to support the inner portion of the ophthalmic lens, to prevent or minimize motion of the inner portion with respect to the optical region of the eye, and to facilitate filling of the lenticular volume with tear fluid.

Fenestrations may be disposed outside the optical region of the ophthalmic lens and inward of a region of engagement between the peripheral portion of the ophthalmic lens and a tissue of the eye. The inner portion and the peripheral portion of the ophthalmic lens are deformable, for example, deformable upon motion of an eyelid and/or over locally protruding epithelial regions so as to inhibit pain, such that the inner portion has a modulus and rigidity that is higher than the modulus and rigidity of the peripheral portion. In certain embodiments, the deformability of the inner portion and the outer portion of the ophthalmic lens is configured so that blinking of the eye induces flow of tear fluid through the fenestrations into and out of the one or more lenticular volumes, and that when the eye is not blinking the inner portion retains a shape that corrects presbyopia and refractive error of the eye.

In certain embodiments, the peripheral portion comprises one or more radius of curvature configured to engage a surface of the eye and thereby resist motion of the inner portion with respect to the optical region of the eye. For example, in certain embodiments, a peripheral portion comprises a plurality of radii of curvature wherein the radii of curvature become smaller from the center of the ophthalmic lens toward the periphery. In certain embodiments, the engagement between the peripheral portion and the tissue surface of the eye along the engagement region inhibits lateral movement of the inner portion relative to the cornea during blinking.

In certain embodiments, methods of correcting presbyopia provided by the present disclosure can, for example, mitigate presbyopia, when viewing with the eye through the anterior surface, substantially independent of a shape of the one or more lenticular volumes throughout a range of astigmatic errors of at least about 0.5 D, at least about 1.0 D, and in certain embodiments, at least bout 1.5 D, and is independent of a rotational orientation of the ophthalmic lens about a viewing axis of the eye.

In certain embodiments, ophthalmic lenses suitable for use in methods provided by the present disclosure comprise an inner portion configured to be disposed over the optical region of the cornea of an eye, and a peripheral portion configured to support the inner portion of the ophthalmic lens by engagement between the peripheral portion of a tissue of an eye such as an epithelium disposed outside the optical region. The inner portion and the peripheral portion are deformable such that the modulus and rigidity of the inner portion is higher than that of the peripheral portion. In certain embodiments, the peripheral portion comprises one or more radii of curvature whereby the peripheral portion engages a surface tissue of an eye to prevent or mitigate motion of the inner portion with respect to the optical region of the cornea during blinking.

For treatment of presbyopia, the inner portion of the ophthalmic lens comprises a surface extending along the inner portion comprising a presbyopia-mitigating refractive shape. The surface comprising a presbyopia-mitigating refractive shape may be an anterior surface of the lens, a posterior surface of a lens, or both an anterior and a posterior surface of a lens. In certain embodiments, the anterior surface of a lens is characterized by a presbyopia-mitigating refractive shape.

For treatment of spherical refractive error the surface extending along the inner portion of the ophthalmic lens comprises a shape configured to correct spherical refractive error.

In certain embodiments, the inner portion may be configured to correct non-spherical refractive errors such as astigmatic error, multifocal error, higher order aberrations, and custom optically corrective functions such as pinholes.

Certain embodiments provided by the present disclosure include lenses comprising an optical component and a coupling component, the optical component comprising a first material having a first modulus, and the coupling component comprising a second material having a second modulus, wherein the first modulus is greater than the second modulus.

In certain embodiments, a lens has a diameter from about 9 mm to about 16 mm, in certain embodiments, from about 10 mm to about 15 mm, and in certain embodiments, from about 12 mm to about 14 mm.

In certain embodiments, inner optical component is characterized by a center thickness from about 100 µm to about 700 µm, from about 100 µm to about 600 µm, from about 150 µm to about 500 µm, from about 200 µm to about 400 µm, and in certain embodiments, from about 250 µm to about 350 µm.

In certain embodiments, an optical component comprises a first material having a first thickness and a second material having a second thickness. In such embodiments, the second material may be disposed on the inner surface (posterior surface) of the optical component, e.g., the surface facing the cornea, and may be the same material as the material forming the coupling component. The second material may have a thickness from about 5 µm to about 60 µm, from about 10 µm to about 50 µm, and in certain embodiments, from about 20 µm to about 40 µm. In such embodiments, where the optical component comprises two materials, the total thickness of the optical component may be from about 100 µm to about 550 µm, from about 200 µm to about 450 µm, and in certain embodiments, from about 250 µm to about 350 µm.

In certain embodiments, the optical component comprises an optically clear material having a modulus from about 10 MPa to about 70 MPa, from about 20 MPa to about 60 MPa, from about 20 MPa to about 50 MPa, and in certain embodiments from about 30 MPa to about 40 MPa.

An optical component may be configured to correct vision or may not be configured to correct vision.

In certain embodiments, an optical component comprises a material selected from silicone, silicone hydrogel, and a combination thereof. In certain embodiments, optical component comprises silicone, in certain embodiments, silicone hydrogel, and in certain embodiments a combination of silicone and silicone hydrogel.

In certain embodiments, an optical component comprises a center thickness from about 150 µm to about 500 µm, a diameter from about 3 mm to about 9 mm, a radius of curvature from about 7 mm to about 12 mm, and a modulus from about 20 MPa to about 50 MPa.

In certain embodiments, a coupling component extends from an optical component to an outer periphery, where the thickness at the juncture with the optical component is the same as or similar to that of the optical component, and gradually tapers toward the outer periphery, wherein the thickness of the coupling component at the periphery is from about 5 µm to about 60 µm, from about 10 µm to about 50 µm, and in certain embodiments, from about 20 µm to about 40 µm.

In certain embodiments, a coupling component comprises at least one radius of curvature. For example, in certain embodiments, a coupling component comprises a single radius of curvature, and in certain embodiments, a coupling component comprises more than one radius of curvature such as two, three, four, five, six, or more than six radii of curvature. The at least one radius of curvature can be, for example, from about 5 mm to about 15 mm, from about 6 mm to about 13 mm, from about 7 mm to about 12 mm, and in certain embodiments, from about 6 mm to about 10 mm. The one or more radius of curvature characterizing a coupling component is less than the radius of curvature of optical component 501.

In certain embodiments, a coupling component comprises a material having a modulus from about 0.05 MPa to about 4 MPa, from about 0.1 MPa to about 3 MPa, from about 0.1 MPa to about 2 MPa, and in certain embodiment from about 0.2 MPa to about 1.5 MPa.

In certain embodiments, a coupling component comprises a material selected from silicone, silicone hydrogel, and a combination thereof. In certain embodiments, a coupling component comprises silicone, in certain embodiments, silicone hydrogel, and in certain embodiments a combination of silicone and silicone hydrogel.

In certain embodiments, a coupling component comprises a plurality of fenestrations extending through the thickness of the coupling component. A coupling component may comprise, for example, from 1 to about 30 fenestrations, from 1 to about 20 fenestrations, and in certain embodiments, from about 1 to about 10 fenestrations. Fenestrations may have any suitable shape to provide egress of tear fluid. Suitable shapes include, for example, circular, elliptical, oval, rectangular, square, slot, or combination of any of the foregoing. Each of the plurality of fenestrations may have the same shape or at least some of the fenestrations may have different shapes. In certain embodiments, the fenestrations have a maximum dimension (hole size) from about 50 µm to about 700 µm, from about 100 µm to about 500 µm, and in certain embodiments, from about 200 µm to about 400 µm. Each of the fenestrations may have the same maximum dimension or at least one of the fenestrations may have a different dimension.

In certain embodiments, a coupling component does not include fenestrations.

In certain embodiments, a coupling component comprises a thickness tapering from the thickness of an inner optical component to a thickness of about 30 µm at the periphery of the coupling component; a plurality or radius of curvature from about 7 mm to about 12 mm; and comprises a material having a modulus from about 0.1 MPa to about 2 MPa. In embodiments in which a coupling component comprises a plurality of radii of curvatures, the radius of curvature decreases from the optical component toward the periphery.

Soft, conformable ophthalmic lenses conform to the shape of the cornea and thereby fail to correct non-spherical aberration. Although hard (RGP) ophthalmic lenses correct astigmatic error, a hard lens must be oriented to correct the asymmetric profile of the eye. Ophthalmic lenses provided by the present disclosure have a modulus and rigidity that is configured to provide one or more lenticular volumes between the optical surface of the eye and the posterior surface of the ophthalmic lens. For correction of presbyopia, the ophthalmic lens can be configured such that the lenticular volume fills with tear fluid. As can be appreciated, it is not necessary to orient such ophthalmic lenses to correct non-spherical optical aberrations.

When used for spherical correction of corneal astigmatism, lenses and methods provided by the present disclosure exhibit the advantages of improved comfort compared to gas permeable lenses, enhanced vision compared to soft contact lenses, and reduced fitting time compared to toric and GP lenses. Lenses and methods can, in certain embodiments, correct greater than 95% of astigmatic errors, irregular astigmatism such as induced by trauma or RK, and early kerotoconus.

In certain embodiments, a lens comprises an optical component that corrects vision. Thus, in addition to spherical correction, the optical component can be configured to support multifocal, higher order aberration or custom optical designs such as pin holes.

In certain embodiments, ophthalmic lenses provided by the present disclosure can be configured to correct refractive error such as astigmatism. The lenses can provide an anterior surface configured to reduce flexure of the inner optical portion and configured to maintain centration of the inner optic portion during wear. Reduced flexure of the inner optical portion can in part be accomplished by increasing the rigidity of the inner portion and by creating a tear lens. Centration of the inner optical portion minimizes astigmatic and prismatic effects caused by tilting of the optic and also minimizes edge distortion.

Ophthalmic lenses provided by the present disclosure can achieve visual correction at least equivalent to that of soft toric contact lenses and achieve a superior comfort level compared to soft toric contact lenses. Furthermore, because the ophthalmic lenses provided by the present disclosure are radially symmetric, fitting to an eye of the patient involves only accommodating the spherical correction and an inventory of lenses for correcting cylindrical error is not required.

Ophthalmic lenses provided by the present disclosure include an inner optic portion configured to be disposed over the optical region of the cornea and a peripheral or outer portion that is disposed radially outward of the inner portion. An ophthalmic lens includes a posterior surface that extends along the inner portion of the lens and is adjacent an eye when applied to an eye of a patient. An ophthalmic lens also includes an anterior surface that extends along the outer surface of the lens and opposite the posterior surface. In general, the inner portion of a lens is configured to improve vision and the peripheral portion is configured to improve comfort. However, the configuration of the inner portion can play a role in determining patient comfort, and the peripheral portion, at least in part, by maintaining centration of the inner optical portion on the optical portion of the cornea during wear enhances the visual outcome.

The inner optical portion of a lens can be configured so that engagement of the posterior surface against the eye deforms the posterior surface so that the posterior surface of the inner portion has a shape diverging from the refractive shape of the epithelium and optical portion of the cornea. The posterior surface of the inner portion of the ophthalmic lens provides a spherical surface to correct a patient's vision.

In certain embodiments, the inner optical portion of a lens is characterized by a diameter from about 5 mm to about 10 mm, from about 7 mm to about 9 mm, from about 7.5 mm to about 8.5 mm, from about 7.8 mm to about 8.2 mm, and in certain embodiments, about 8 mm. The posterior inner portion of a lens is characterized by a substantially spherical profile without a cylindrical component. In certain embodiments, an inner portion is characterized by a thickness from about 100 μm to about 900 μm, from about 200 μm to about 900 μm, from about 300 μm to about 700 μm, 500 μm to 900 μm, from 550 μm to 850 μm, from 600 μm to 750 μm, from 600 μm to 800 μm, from 600 μm to 725 μm, and in certain embodiments, from 600 μm to 700 μm. In comparison, commercially available toric contact lenses for correcting refractive error are characterized by a thickness from about 150 μm to about 250 μm.

In certain embodiments, the inner portion comprises a first layer of material forming the posterior surface of the lens and a second layer of material forming the anterior surface of the lens. The first layer is thin and can be formed from the same material as that of the peripheral portion. In certain embodiments, first layer is from 10 μm to 60 μm, from 20 μm to 50 μm, and in certain embodiments from about 25 to about 35 μm thick. The first layer retains the inner portion. In certain embodiments, an inner portion comprises a third layer overlying the anterior surface of the second layer. Again, as with the first layer, the third layer is thin, having for example a similar thickness to that of the first layer, can be formed from the same material as the material forming the peripheral region, and retains the second layer, which is also referred to as the button. The second layer or button provides the bulk of the thickness of the inner portion of a lens.

The inner optical portion of a lens is characterized by a rigidity where the rigidity of the inner portion is greater than the rigidity of the peripheral portion of the lens. In certain embodiments, the inner portion is characterized by a rigidity from about 1E9 MPa-μm$^3$ to about 1E11 MPa-μm$^3$, from about 1E9 MPa-μm$^3$ to about 1E10 MPa-μm$^3$, from about 1E9 MPa-μm$^3$ to about 1E11 MPa-μm$^3$, and in certain embodiments, from 5E9 MPa-μm$^3$ to about 5E10 MPa-μm$^3$. As disclosed herein, the rigidity is a function of the thickness and the modulus of the material. Ophthalmic lenses provided by the present disclosure employ a soft, low modulus material for the inner portion and achieve increased rigidity by increasing the cross-sectional thickness. For example, in certain embodiments, the modulus of the material forming the inner optical portion is from about 20 MPa to about 2000 MPa, from about 20 MPa to about 1000 MPa, or from about 20 MPa to about 500 MPa. It is believed that the soft, low modulus material improves patient comfort.

In certain embodiments, the rigidity of the inner portion of the lens is greater than the rigidity of the outer portion. For example, in certain embodiments, a lens can have an inner rigidity from about 1.2E-6 Pa-m$^3$ to about 3.1E-3 Pa-m$^3$, from about 1E-5 Pa-m$^3$ to about 1E-3 Pa-m$^3$, and in certain embodiments, from about 1E-4 Pa-m$^3$ to about 1E-3 Pa-m$^3$.

In certain embodiments, a lens can have an outer rigidity from about 5.4E-9 Pa-m$^3$ to about 1.5E-4 Pa-m$^3$, from about 1E-8 Pa-m$^3$ to about 1E-4 Pa-m$^3$, from about 1E-7 Pa-m$^3$ to about 1E-5 Pa-m$^3$, and in certain embodiments, from about 1E-6 Pa-m$^3$ to about 1E-5 Pa-m$^3$.

The rigidity of a portion of the lens can be increased by increasing the thickness of a single material, using a material having a higher modulus for the same thickness, or by combining materials having different moduli and different thicknesses.

The rigidity of a portion of a lens is approximated by the modulus of the material comprising the portion multiplied by the cube of the thickness. When a portion comprises more than one material, the rigidity can be approximated based on the average modulus of the portion multiplied by the thickness cubed of the portion. For example, a portion comprising a first material with a modulus of 20 MPa and a thickness of 90 µm and a second material with a modulus of 5 MPa and a thickness of 10 µm will have an average modulus of 18.5 MPa. The rigidity of the portion can then be approximated by multiplying the average modulus times the cube of the thickness, which for the present example is determined to be 18.5E-6 Pa-m$^3$. Although these calculations can be based on approximations, a person skilled in the art can conduct simulations, for example finite element modeling simulations, so as to more accurately estimate relative rigidity and/or can measure pressures and deflection forces to determine rigidities of the various portions of the lens.

In certain embodiments, an inner portion of a lens is further characterized by an index of refraction that may correspond substantially to the index of refraction of the cornea, for example the index of refraction may be within a range from about 1.38 to about 1.43 so as to match the index of refraction of the cornea to within about ±0.05. In certain embodiments, the inner portion and the outer portion are characterized by an index of refraction from about 1.38 to about 1.43 so as to match the index of refraction of the cornea to within about ±0.05.

In certain embodiments, for example, where the lens provides vision correction, the inner portion may be characterized by an index of refraction that is different from the refractive index of the cornea.

In certain embodiments, an inner portion comprises one or more optically clear materials having a modulus from about 20 MPa to about 3000 MPa, from 20 MPa to about 2000 MPa, from about 100 MPa to about 1500 MPa, from about 200 MPa to about 1000 MPa, and in certain embodiments from about 300 MPa to about 1000 MPa.

In certain embodiments, an inner portion comprises a material selected from silicone, silicone hydrogel, a hydrogel, and a combination of any of the foregoing. In certain embodiments, an inner portion comprises silicone, in certain embodiments, silicone hydrogel, in certain embodiments, a hydrogel, and in certain embodiments a combination of silicone and silicone hydrogel.

In certain embodiments, a bimodulus multifocal lens is characterized by at least a tri-curve profile including a central curvature, a mid-periphery curvature, and a peripheral curvature. The central curvature refers to the curvature of the inner portion of the lens spanning an approximately 3 mm diameter region in the center of the lens. The mid-periphery curvature refers to the curvature in a radial region about 5 mm from the center of the lens. The peripheral curvature refers to the curvature toward the edge of the lens. In certain embodiments, the transition from the peripheral curvature region to other parts of the lens may not be smooth and may be characterized by an angle. In certain embodiments, the diameter of central region is from about 5 mm to about 7 mm, from about 5.5 mm to about 6.5 mm, and in certain embodiments is about 6 mm. In certain embodiments, the mid-peripheral regions extend from the edge diameter of center region to about 5 mm from the centerline. Accordingly, the diameter of the mid-peripheral region can be from about 7 mm to about 11 mm, from about 7 mm to about 10 mm, from about 6.5 mm to about 11 mm, from about 6.5 mm to about 10 mm, and in certain embodiments, from about 6 mm to about 10 mm. In certain embodiments, the peripheral diameter of a lens can be from about 11 mm to about 16 mm, from about 12 mm to about 15 mm, and in certain embodiments, about 14 mm. As referred to herein, the outer portion comprises the mid-peripheral regions, which are also referred to as intermediate portions, and the peripheral portion.

In certain embodiments, an outer portion comprises a material having a modulus from about 0.05 MPa to about 4 MPa, from about 0.1 MPa to about 3 MPa, from about 0.1 MPa to about 2 MPa, and in certain embodiment from about 0.2 MPa to about 1.5 MPa. In certain embodiments, the outer portion comprises a material characterized by a modulus from about 0.9 MPa to about 1.5 MPa, from about 1 MPa to about 1.4 MPa, and in certain embodiments, about 1.2 MPa. In certain embodiments, the material forming the peripheral portion is characterized by a modulus from about 0.01 MPa to about 10 MPa, from about 0.01 MPa to about 8 MPa, from about 0.01 MPa to about 5 MPa, and in certain embodiments, from about 0.01 MPa to about 2 MPa. In certain embodiments, a lens comprises an inner portion formed from a material such as a silicone polymer, silicone hydrogel, or hydrogel characterized by a modulus of about 25 MPa, and an outer portion formed from a material such as a silicone polymer or silicone hydrogel characterized by a modulus of about 1.2 MPa.

In certain embodiments, an outer portion comprises a material selected from silicone, silicone hydrogel, a hydrogel, and a combination of any of the foregoing. In certain embodiments, a coupling component comprises silicone, in certain embodiments, silicone hydrogel, a hydrogel, and in certain embodiments a combination of silicone, silicone hydrogel, and/or a hydrogel.

In certain embodiments, the material forming a lens including both the inner and outer portions is characterized by a low water content and is characterized by low water or ion permeability. In certain embodiments, the water content is less than about 5%, less than about 4%, and in certain embodiments, less than about 3%. In certain embodiments, the material forming a lens has a water content less than about 1%, less than about 0.6%, and in certain embodiments, less than about 0.3%. In certain embodiments, the material is characterized by an ion permeability less than about 0.4×10$^{-6}$ cm$^2$/sec, less than about 0.2×10$^{-6}$ cm$^2$/sec, and in certain embodiments, less than about 0.1×10$^{-6}$ cm$^2$/sec.

In certain embodiments, the inner portion comprises a different material than the outer portion. In certain embodiments, the inner portion and the outer portion comprise the same material. In embodiments in which the inner portion and the outer portion comprise the same material, the different moduli may be realized by the detailed chemistry of the polymer used, such as characterized by different crosslinking densities.

In certain embodiments, the inner portion of a lens and the outer portion of a lens comprise a first material characterized by a first modulus and extending along a lower surface of the lens; and the inner portion comprises a second material characterized by a second modulus disposed anteriorly to the first material, the second modulus being greater than the first modulus. In such embodiments, the first material is a thin layer that is configured to promote comfort of the lens when applied to the cornea by cushioning between the anterior surface of the cornea and the layer of the first material. The second material is configured to promote a beneficial optical shape of an anterior surface of the applied lens over the eye.

The peripheral portion can be configured to provide tear flow between the anterior surface of the lens and the epithelium. In certain embodiments, the peripheral portion comprises a plurality of fenestrations extending from the anterior to the posterior surface of the peripheral portion. In certain embodiments, the plurality of fenestrations are disposed at a radius from a central optical axis of the ophthalmic lens such as for example, at a radius proximate to the interface between the inner portion and the peripheral portion. The plurality of fenestrations may be symmetrically or asymmetrically disposed. The fenestrations may be configured to pump tear liquid between the peripheral portion and the epithelium when the eye blinks so as to maintain a tear layer between the posterior surface of the lens and the epithelium and/or across the anterior surface of the lens. In certain embodiments, the plurality of fenestrations may be configured to facilitate removal of the lens from the eye. In certain embodiments, the plurality of fenestrations may be configured to facilitate air dissipation if air bubbles trapped underneath the lens during application. In certain embodiments, the plurality of fenestrations facilitates the removal of air bubble entrapped within any lenticular volumes following application of a lens to a patient's eye. The plurality of fenestrations may facilitate both removal of the lens form the eye and dissipation of air bubbles. In certain embodiments, the plurality of fenestrations improves the reproducibility of visual outcome in a population of patients wearing the lens compared to the visual outcome in a population of patients wearing a comparable lens without fenestrations.

In certain embodiments, the inner portion, the peripheral portion, or both the inner and peripheral portions of an ophthalmic lens provided by the present disclosure are radially symmetric. In certain embodiments, the anterior surface of the inner portion and the posterior surface of the inner portion are radially symmetric.

In certain embodiments of ophthalmic lenses provided by the present disclosure, the inner portion and the peripheral portion can be configured to allow movement of the lens relative to the eye in response to blinking of the eye. In such embodiments, an ophthalmic lens can be configured such that the inner optical portion centers on the optical portion of the cornea following blinking. During blinking the inner portion, the peripheral portion, or both the inner and peripheral portions may deform and/or move with respect to the center optical axis of the cornea. When an ophthalmic lens is worn by a patient, depending at least in part by the shape of the patient's eye and the configuration of the lens, the ophthalmic lens may move during blinking or may exhibit only micro-movement.

In certain embodiments of ophthalmic lenses provided by the present disclosure, the inner portion and the peripheral portion are configured to provide a tear fluid flow between the peripheral portion of the ophthalmic lens and the epithelium.

In certain embodiments, an ophthalmic lens provided by the present disclosure includes a reinforcement ring disposed toward the interface between the inner portion and the peripheral portion. In such embodiments, an ophthalmic lens having a central optic portion, a peripheral portion or skirt, mechanically coupled to the inner portion, in part by a thin layer disposed along the posterior surface of the inner portion. An inner portion can be characterized by a substantially uniform thickness and a rigidity that is greater than the rigidity of peripheral portion. Peripheral portion can include a heal and a peripheral edge. A reinforcement ring can be disposed toward the interface between the central optic portion and the peripheral portion, and in certain embodiments, a reinforcement ring can be embedded within the central optic portion. In certain embodiments, the central optic portion and the peripheral portion may have one or more radius of curvature. A reinforcement ring may be disposed or embedded within the inner portion, disposed or embedded within the peripheral portion, or disposed at the interface between the inner and peripheral portions. A reinforcement ring is configured to prevent or minimize flexure of the inner optic portion from forces on the eye and/or forces of the eyelids such as during blinking. A reinforcement ring is disposed at a radial location such that the ring does not interfere with vision. A reinforcement ring may be a radially symmetric ring and can be configured to facilitate centering of the ophthalmic lens on the optical region of the cornea during wear. In certain embodiments, a reinforcement ring may be made from a material having a higher modulus than that of the materials forming the inner portion and the peripheral portion of the lens. In certain embodiments, a reinforcement ring may be made from a rigid, optically opaque or translucent material such as, for example, polyimide, polyether ether ketone, polyetherimide, polysulfone, polyether sulfone, polycarbonate, silicone-acrylate, fluorosilicone-acrylate, or a combination of any of the foregoing. In certain embodiments, a reinforcement ring may be made of a transparent rigid gas permeable polymer such as, for example, polymethylmethacrylate, fluorosilicone acrylate, a silicone acrylate or a combination of any of the foregoing. In certain embodiments, a reinforcement ring may be made from a metal such as, for example, titanium, stainless steel, cobalt steel, or a combination of any of the foregoing. In certain embodiments, the material forming the reinforcement ring has the same index of refraction as that of the material forming the inner portion. In certain embodiments, a reinforcement ring may have, for example, an inner diameter from about 4 mm to about 12 mm, from about 6 mm to about 12 mm, from about 8 mm to about 12, and in certain embodiments, from about 8 mm to about 10 mm. In certain embodiments, a reinforcement ring may have, for example, a width from about 0.1 mm to about 5 mm, from about 1 mm to about 4 mm, from about 2 mm to about 3 mm, and in certain embodiments, from about 0.5 mm to about 2 mm. In certain embodiments, a reinforcement ring may have, for example, a thickness from about 0.05 mm to about 0.5 mm, from about 0.1 mm to about 0.4 mm, from about 0.2 mm to about 0.3 mm, and in certain embodiments from about 0.2 mm to about 0.4 mm. A reinforcement ring may or may not include features to enhance adhesion of the ring to the material forming the center optic portion and/or the material forming the peripheral portion of the lens. For example, a reinforcement ring may include concave and/or convex surfaces, indentations, partial through-holes, full through-holes, perforations, serrated or irregular edges, or a combination of any of the foregoing. In general, a reinforcing ring is configured and disposed such it does not adversely impact visual acuity.

The peripheral portion of a lens can be tapered toward the peripheral edge. The taper may be continuous or discontinuous. The peripheral portion may be flared outward toward the peripheral edge and is referred to as a modified heeled configuration. In general, the cross-sectional shape of an ophthalmic lens can be configured to correct presbyopia and any refractive error of any eye, center the lens on the optical portion of the cornea, facilitate motion of the lens with respect to the eye, provide flow of tear liquid between the posterior surface of the lens and epithelium, and provide comfort to a patient wearing the lens. The ability of the lens to move, provide a fluid layer, and exchange tear fluid facilitates eye health and improves comfort for extended wear.

In certain embodiments, the inner portion is characterized by a rigidity from 4E8 MPa-$\mu$m$^3$ to 1E10 MPa-$\mu$m$^3$, from 6E8 MPa-$\mu$m$^3$ to 1E10 MPa-$\mu$m$^3$, from 8E8 MPa-$\mu$m$^3$ to 1E10 MPa-$\mu$m$^3$, from 1E9 MPa-$\mu$m$^3$ to 1E10 MPa-$\mu$m$^3$ from 2E9 MPa-$\mu$m$^3$ to 1E10 MPa-$\mu$m$^3$, from 4E9 MPa-$\mu$m$^3$ to 1E10 MPa-$\mu$m$^3$, and in certain embodiments, from 6E9 MPa-$\mu$m$^3$ to 1E10 MPa-$\mu$m$^3$. In certain of such embodiments, the thickness of the inner portion is from about 100 $\mu$m to 900 $\mu$m, in certain embodiments, from 200 $\mu$m to 800 $\mu$m, and in certain embodiments, from 400 $\mu$m to 800 $\mu$m.

In certain embodiments, ophthalmic lenses provided by the present disclosure are characterized by a center rigidity of at least about 6E9 MPa-$\mu$m$^3$, at least about 8E9 MPa-$\mu$m$^3$, at least about 1E10 MPa-$\mu$m$^3$, at least about 1.2E10 MPa-$\mu$m$^3$ and in certain embodiments, at least about 1.4E10 MPa-$\mu$m$^3$. The center rigidity can be selected based on the modulus and thickness of the material or materials used to form the center optical portion of a lens. In general, the rigidity of the central portion of a lens is selected to maintain a spherical anterior surface during use. In certain embodiments, the thickness of the center of the optical portion is at least 200 $\mu$m, at least 300 $\mu$m, at least 400 $\mu$m, at least 500 $\mu$m, at least 600 $\mu$m, at least 700 $\mu$m, and in certain embodiments at least 800 $\mu$m. In certain embodiments, the thickness of the center of the optical portion is from 100 $\mu$m to 900 $\mu$m, from 200 $\mu$m to 900 $\mu$m, from 300 $\mu$m to 900 $\mu$m, from 400 $\mu$m to 900 $\mu$m, from 500 $\mu$m to 900 $\mu$m, from 600 $\mu$m to 700 $\mu$m, from 700 $\mu$m to 800 $\mu$m, and in certain embodiments at least 300 $\mu$m to 600 $\mu$m. In general, lenses with a thinner central thickness are more comfortable to wear. In certain embodiments, the inner portion of an ophthalmic lens is formed from a material characterized by a modulus less than 1,000 MPa, less than 750 MPa, less than 500 MPa, less than 250 MPa, less than 200 MPa, less than 100 MPa, less than 50 MPa, less than 30 MPa, less than 20 MPa, and in certain embodiments, less than 10 MPa. In certain embodiments, an ophthalmic lens is characterized by a center rigidity of at least about 6E9 MPa-$\mu$m$^3$, a thickness from 200 $\mu$m to 900 $\mu$m, and a modulus from 20 MPa to 2,000 MPa, and in certain embodiments a modulus from 10 MPa to 200 MPa.

In certain embodiments, an inner optic portion is characterized by a thickness from 100 $\mu$m to 900 $\mu$m, by a modulus from about 10 MPa to about 1,000 MPa, and a rigidity of at least about 4E8 MPa-$\mu$m$^3$. In certain embodiments, an inner optic portion is characterized by a thickness from 100 $\mu$m to 900 $\mu$m, by a modulus from about 10 MPa to about 600 MPa, and a rigidity of at least about 4E8 MPa-$\mu$m$^3$. In certain embodiments, an inner optic portion is characterized by a thickness from 100 $\mu$m to 900 $\mu$m, by a modulus from about 10 MPa to about 300 MPa, and a rigidity of at least about 4E8 MPa-$\mu$m$^3$. In certain embodiments, an inner optic portion is characterized by a thickness from 100 $\mu$m to 900 $\mu$m by a modulus from about 10 MPa to about 100 MPa, and a rigidity of at least about 4E8 MPa-$\mu$m$^3$.

In certain embodiments, an inner portion of an ophthalmic lens is characterized by a center rigidity of at least about 1E9 MPa-$\mu$m$^3$, a thickness from 100 $\mu$m to 800 $\mu$m, and a modulus from 10 MPa to 800 MPa, and in certain embodiments a modulus from 10 MPa to 200 MPa. In certain embodiments, an ophthalmic lens is characterized by a center rigidity of at least about 5E8 MPa-$\mu$m$^3$, a thickness from 100 $\mu$m to 800 $\mu$m, and a modulus from 10 MPa to 800 MPa, and in certain embodiments a modulus from 10 MPa to 200 MPa.

In certain embodiments and depending at least in part on the shape of a patient's cornea, the posterior surface of an ophthalmic lens may not completely conform to the surface of the epithelium during wear. Thus, at least a portion of the inner portion, the peripheral portion, or both the inner and peripheral portions form a vault over at least certain portions of the underlying epithelium to form one or more lenticular volumes. The lenticular volumes may be filled with tear liquid. The ability of the lens to move on the eye during blinking and any fenestrations if present can circulate tear fluid into and out of the lenticular volume and exchange tear fluid with other parts of the eye.

Vision and health of the eye can be enhanced by the presence of fenestrations. Furthermore, the semi-rigid inner optic portion is sufficiently flexible to accommodate a range of corneal curvatures and is able to mask corneal toricity by forming a lenticular tear volume between the posterior surface of the lens and the cornea. The fenestrations provide a supply of fluid between the posterior surface of the lens and the epithelium of the eye to maintain a tear layer, which supports the intended curvature of the lens to provide good vision. Fenestrations also maintain eye health by allowing for rapid tear exchange to circulate metabolic waste and to transmit oxygen to the tear layer. Fenestrations can also prevent a lens from creating vacuum seal to the eye, allowing the lens to move on the eye and facilitating lens removal.

In certain embodiments, ophthalmic lenses provided by the present disclosure include a plurality of fenestrations. The fenestrations can provide a supply of tear fluid to establish and maintain a tear volume between the posterior surface of the inner optic portion and the cornea to support the intended lens curvature, allow exchange of tear fluid to circulate metabolic waste, and to supply and maintain a high oxygen content at the surface of the cornea.

Fenestrations can be disposed within the inner optic portion of the ophthalmic lens, within the peripheral portion of the ophthalmic lens, or within both the inner optic and peripheral portions of the ophthalmic lens. In certain embodiments, the fenestrations may be disposed along one or more rings situated at a radius from the central axis of the ophthalmic lens. Each ring may include from one (1) to twenty (20) fenestrations. In certain embodiments, fenestrations may be disposed along one or more rings disposed at different radii from the central axis of the ophthalmic lens.

For example, in certain embodiments the plurality of fenestrations can be disposed at a combination of a first radius, a second radius, a third radius, and a fourth radius from a central optical axis of the ophthalmic lens, wherein: the first radius is disposed within the inner optic portion and from 0.5 mm to 1.0 mm from an interface between the inner optic portion and the peripheral portion; the second radius is disposed within the peripheral portion and from 0.5 mm to 1.5 mm from the interface between the inner optic portion and the peripheral portion; the third radius is disposed within the peripheral portion and from 1.5 mm to 2.5 mm from the interface between the inner optic portion and the peripheral portion; and the fourth radius is disposed within the peripheral portion and from 0.5 mm to 2.5 mm from an edge of the peripheral portion.

A plurality of fenestrations may be disposed within the inner optic portion, within the peripheral portion, or both the inner optic portion and the peripheral portion of the ophthalmic lens. At least some of the fenestrations may be disposed within the inner optic portion of the lens proximate the interface. In certain embodiments, fenestrations within the inner optic portion are disposed at a location that is not coincident with the optical region of the cornea such that the fenestrations do not interfere with vision. In certain embodiments, at least some of the fenestrations may be disposed within the peripheral portion proximate the interface. In certain embodiments, at least some of the fenestrations may be located at one or more positions within a middle of the peripheral portion and/or at least some of the fenestrations may be located proximate the peripheral edge of an ophthalmic lens. Fenestrations may be located at specific radii from the center of the ophthalmic lens or may be characterized by any suitable pattern and distribution.

In certain embodiments, an ophthalmic lens may comprise from 1 to 20 fenestrations. The location and cross-section of certain fenestrations may be configured to pump tear liquid between the posterior surface of the lens and the epithelium when the eye blinks. Circulation of tear fluid can help to maintain eye health. Certain fenestrations may be configured to maintain a tear layer between the eye and one or more portions of the posterior surface of the inner optic portion. The tear layer can help to maintain health of the eye, can help to provide comfort, and can facilitate removal of the lens from the eye. Certain portions of an ophthalmic lens may conform to the cornea while other portions may create one or more lenticular volumes between the posterior surface of a lens and the cornea. Certain fenestrations can be configured to maintain tear fluid within the lenticular volumes. The lenticular volumes in conjunction with the ophthalmic lens form a tear lens for improving vision. Fenestrations located proximate to the interface between the inner optic portion and the peripheral portion may serve to maintain tear fluid within lenticular volumes. Certain fenestrations such as those located within the peripheral portion may be configured to maintain eye health and to facilitate removal of the lens from the eye.

In certain embodiments, a plurality of fenestrations can be disposed within the inner optic portion to provide for sufficient tear flow beneath the inner optic portion to establish and maintain a lenticular tear volume between the posterior surface of the inner optic portion and the cornea. The tear volume maintains the spherical shape of the lens on the eye to improve patient vision. While certain portions of the posterior surface of the lens can conform to the surface of the cornea, where the cornea is characterized by toric and/or cylindrical irregularities, the inner optic portion is sufficiently rigid that it bridges the corneal irregularities creating a lenticular volume, which is filled with tear fluid.

In certain embodiments, the tear volume beneath certain portions of the inner optic portion of the ophthalmic lens can be maintained by fenestrations located just outside the diameter of the inner optic portion of the lens.

Fenestrations located within the peripheral portion of the lens can maintain eye health, provide tear film that facilitates motion of the lens on the cornea, and/or facilitate removal of the lens from the eye.

Fenestrations may be any suitable shape, be situated with any suitable orientation with respect to the cross-sectional profile of the lens. In certain embodiments, fenestrations are characterized by a circular cross-section having a diameter from about 50 µm to about 300 µm, from about 80 µm to about 250 µm, and in certain embodiments, from about 100 µm to about 200 µm.

In certain embodiments, ophthalmic lenses provided by the present disclosure include a sag height from about 3 mm to about 5 mm, in certain embodiments, from about 3.5 mm to about 4.5 mm, and in certain embodiments, from 3.5 mm to about 4.2 mm. The sag height refers to the distance from the center of the lens to a line extending from the peripheral edge of a lens. For a particular optic curvature, lenses may be provided with several different sag heights to accommodate different eyeball sizes among a general population of patients. For example, lenses having a particular optic curvature may be provided with three different sag heights from a nominal sag height of 4.0 mm in steps from about 0.15 mm to 0.3 mm. For example, for lenses having a particular optic curvature, lenses having sag heights of 3.7 mm, 4.0 mm, and 4.3 mm can be provided. In certain embodiments, for lenses having a particular optic curvature, lenses having sag heights of 3.85 mm, 4.0 mm, and 4.15 mm; sag heights of 3.8 mm, 4.0 mm, and 4.2 mm; and in certain embodiments, sag heights of 3.75 mm, 4.0 mm, and 4.25 mm, can be provided.

To enhance comfort, ophthalmic lenses provided by the present disclosure may include a thickness of a material having a low Young's modulus disposed on the posterior surface of the inner optic portion of the lens. The thickness may be less than about 50 µm, less than about 40 µm, less than about 30 µm, less than about 20 µm, and in certain embodiments, less than 10 µm. The material forming the thin layer or web may have a Young's modulus from about 0.01 MPa to about 10 MPa. The material forming the thin layer underlying the inner optic portion may be the same as or different from the material forming the peripheral portion of the ophthalmic lens. In certain embodiments, the thin layer underlying the inner optic portion may comprises a material selected from silicone, silicone hydrogel, a hydrogel, and a combination of any of the foregoing.

In certain embodiments of an ophthalmic lens, the inner optic portion and the peripheral portion are characterized by a water content less than about 5%.

In certain embodiments of an ophthalmic lens, a refractive error of the eye includes a cylindrical error; and the inner optic portion is characterized by a substantially spherical surface so that correction of the cylindrical error by the lens is primarily effected by the divergence of the shape of the inner optic portion from the refractive shape of the cornea.

In certain embodiments of an ophthalmic lens, the inner optic portion and the peripheral portion can be configured to allow movement relative to the eye.

In certain embodiments of an ophthalmic lens, the inner optic portion and the peripheral portion can be configured to provide a tear fluid flow between the inner optic portion of the ophthalmic lens and the cornea.

In certain embodiments of an ophthalmic lens, the refractive error of the eye comprises astigmatism; and the anterior surface of the inner optic portion and the posterior surface of the inner optic portion are radially symmetric.

In certain embodiments of an ophthalmic lens, the ophthalmic lens further comprises a plurality of fenestrations, wherein the plurality of fenestrations is disposed within the inner optic portion, the peripheral portion, or both the inner optic portion and the peripheral portion.

In certain embodiments of an ophthalmic lens, at least some of the plurality of fenestrations are disposed proximate an interface between the inner optic portion and the peripheral portion.

In certain embodiments of an ophthalmic lens, at least some of the plurality of fenestrations are configured to pump tear liquid between the posterior surface of the lens and the epithelium when the eye blinks.

In certain embodiments of an ophthalmic lens, at least some of the plurality of fenestrations are configured to maintain tear fluid within one or more lenticular volumes between the posterior surface of the inner optic portion and the cornea.

In certain embodiments of an ophthalmic lens, the inner optic portion can be configured primarily to correct vision and the peripheral portion can be configured primarily to enhance comfort.

In certain embodiments of an ophthalmic lens, the posterior surface of the inner optic portion comprises a thickness of a low modulus material.

In certain embodiments of an ophthalmic lens, the ophthalmic lens can be characterized by a sagittal height (SAG) from 3 mm to 5 mm.

In certain embodiments of an ophthalmic lens, the ophthalmic lens comprises a reinforcement ring disposed proximate an interface between the inner optic portion and the peripheral portion.

In certain embodiments of an ophthalmic lens, the reinforcement ring can be embedded within the inner optic portion.

In certain embodiments of an ophthalmic lens, the reinforcement ring is disposed within the inner optic portion and at a location that is not coincident with the optical region of the cornea.

In certain embodiments of an ophthalmic lens, the reinforcement ring can be formed from a material having a higher modulus than a modulus of a material forming the inner optic portion.

In certain embodiments of an ophthalmic lens, the ophthalmic lens is configured to center on the optical region of the cornea following blinking of the eye.

In certain embodiments, the inner optic portion can be characterized by a maximum thickness from about 50 µm to about 900 µm. The maximum thickness refers to the thickness at the center of the lens. In certain embodiments in which the lens has a spherical power, the thickness of the inner optic portion may decrease from the thickness at the center toward the periphery of the inner optic portion. In certain embodiments, the maximum thickness of the inner optic portion may be from about 50 µm to 700 µm, from 100 µm to 600 µm, or from 100 µm to 400 µm.

In embodiments in which the inner optic portion can be configured to provide a spherical correction, the thickness of the inner portion will not be uniform, and will be shaped to provide, for example, a spherical power from about −3.00 D to about +3.00 D. In such embodiments the thickness of the inner optic portion can taper from the center toward the peripheral portion depending on the spherical power.

In embodiments, in which correction of spherical power is not required, the thickness of the inner portion may be substantially uniform.

In certain embodiments, ophthalmic lenses are radial symmetric.

Certain embodiments of ophthalmic lenses provided by the present disclosure can be configured to provide one or more lenticular volumes between at least a portion of the posterior surface of the inner optic portion and the surface of the cornea.

When placed on the cornea, the posterior surface of the inner optic portion of the ophthalmic lens comprises a shape diverging from the refractive shape of the cornea and define a lenticular volume. In certain embodiments, at least a portion of the peripheral portion may also diverge from the refractive shape of the cornea and may define a lenticular volume. The peripheral portion of the lens may diverge from the refractive shape of the cornea near the interface of the inner optic portion and the peripheral portion. Depending upon the shape of the cornea, one or more lenticular volumes may be formed A lenticular volume defined by the peripheral portion of a lens may be fluidly connected to a lenticular volume defined by the inner portion and may facilitate exchange of tear fluid within one or more lenticular volumes. Tear exchange within a lenticular volume and to and from a lenticular volume may be facilitated by fenestrations through the ophthalmic lens. Such fenestrations may serve to pump tear fluid to and from a lenticular volume during blinking of the eye.

In certain embodiments, the inner optic portion comprises a shape configured to provide a spherical power to correct refractive error, and in certain embodiments, comprises a shape configured to correct non-spherical refractive error.

In certain embodiments, the anterior surface of the inner optic portion is characterized by a substantially spherical shape.

In certain embodiments, the posterior surface of the inner optic portion may be characterized by a substantially spherical shape.

In other embodiments, the posterior surface of the inner optic portion may be characterized by a non-spherical shape such as, for example, a toric shape. A lens in which the posterior surface is characterized by a non-spherical shape such as a toric shape is referred to as a bicurve or bitoric configuration. In embodiments in which the posterior surface is characterized by a toric shape, the shape can be configured such that the toric shape of inner optic portion aligns with an astigmatic axis of the cornea. The toric shape can reduce the lenticular volume compared to a spherical shape. The reduced lenticular volume results in less lens flexure of the contact lens during blinking.

A bitoric ophthalmic lens may have a bicurve surface on the posterior surface of the lens. A back surface bicurve design can improve the alignment of the lens with an astigmatic axis of the cornea. This has the advantage that there can be less space between the lens and the cornea, i.e., the lenticular volumes will be less, and may reduce the extent of flexure. In certain embodiments, a back surface bitoric design can induce a small amount of astigmatism such as, for example, 20%.

In certain embodiments, an ophthalmic lens will have a spherical power effect bitoric design that is independent of lens orientation. By adding a spherical power to the anterior surface of a back surface bicurve lens, the induced astigmatism can be corrected resulting in an optically spherical lens that is not sensitive to lens orientation.

In certain embodiments, the inner optic portion comprises a single material throughout the thickness.

In certain embodiments, the inner optic portion comprises more than one material, with different materials disposed in different axial portions of the inner optic portion. For example, the inner optic portion may comprise a first portion disposed toward and/or forming the anterior surface of the inner optic portion, toward and/or forming the posterior surface of the inner optic portion, or toward the center of the inner optic portion. In such embodiments, the first portion comprises a material characterized by a modulus higher than that of a material forming the peripheral portion. The first portion comprises a material and is characterized by a thickness sufficient to provide correction of refractive error.

In such embodiments, a first portion is configured to provide an optical function by providing one or more lenticular volumes between the posterior surface and the cornea, by providing spherical power, and/or in bicurve designs providing a toric component. The first portion comprises a material characterized by a modulus from about 100 MPa to about 2000 MPa and can have a maximum thickness from about 50 μm to about 900 μm. The thickness of the first portion may taper toward the interface between the inner optic portion and the peripheral portion. The first portion can have a spherically shaped anterior surface and may be shaped to provide a spherical power from about −3.00 D to about +3.00 D.

One or more portions may be disposed anterior to the first portion, posterior to the first portion, or both anterior to and posterior to the first portion. In certain embodiments, an anterior and/or posterior portion is formed from a material having a lower modulus than that of the first portion. In certain embodiments, an anterior and/or posterior portion is characterized by a maximum thickness that is less than that of the first portion. In certain embodiments, the anterior and/or posterior portions are configured to provide comfort, to modify the hydrophilicity/hydrophobicity of the inner optic portion, and/or to retain the first portion with the peripheral portion of the lens. In general, the anterior portion and/or posterior portion do not provide an optical function. In certain embodiments, the anterior portion and/or the posterior portion comprises a material having a modulus from about 0.1 MPa to about 10 MPa and may have a maximum thickness from about 5 μm to about 100 μm. The thickness of the anterior portion and/or posterior portion may be substantially the same across the radial profile or may vary across the radial profile of the lens. The thickness of the anterior portions and the posterior portions may depend at least in part on the shape of the first portion. In certain embodiments, an anterior portion and/or posterior portion comprises a hydrogel.

By virtue of being characterized by at least different moduli, the material forming the first portion is not structurally the same as the anterior material and/or the posterior material, although the materials may be based on similar chemistries and/or materials. In certain embodiments, the anterior material can be the same as the posterior material and in certain embodiments the anterior material can be different than the posterior material. In certain embodiments, the anterior material, the posterior material, and the peripheral material are the same and the anterior material and the posterior material extend from the inner optic portion to the peripheral portion.

In certain embodiments, one or more surfaces of the first portion may be treated to enhance the mechanical integrity and/or adhesion of the interface with the first portion and the anterior portion and/or the posterior portion.

In certain embodiments, the inner optic portion, the peripheral portion, or both the inner optic portion and the peripheral portion may comprise one or more coatings on the anterior surface, the posterior surface, or both the anterior surface and the posterior surface.

The one or more coatings may be selected, for example, to improve comfort, to facilitate tear flow, and/or to modify the hydrophilicity/hydrophobicity of the lens or portion of the lens. The one or more coatings may be the same in both the inner optic portion and in the peripheral portion or may be different in different portions of the lens.

In certain embodiments, the materials forming the inner optic portion, the peripheral portion, or both the inner optic portion and the peripheral portion are non-hydrous. A non-hydrous material refers to a material characterized by a water content less than about 10 wt %, less than about 5 wt %, and in certain embodiments, less than about 1 wt % in its fully hydrated state.

A material may be intrinsically non-hydrous or may be rendered functionally non-hydrous by situating or encapsulating a material between non-hydrous materials and/or by a coating with a non-hydrous and/or hydrophobic material. For example, a hydrophobic coating such as an Oc Dy coating may be used to prevent hydration of a hydrous material.

The material forming the inner optic portion and the peripheral portion may be characterized by the same or by a different water content.

In embodiments in which the inner optic portion comprises more than one axial portions, the first or optical portion may comprise a non-hydrous material and the anterior portion and/or posterior portions may comprise a hydrous material, such as a hydrogel.

In certain embodiments, the inner optic portion comprises an inner material characterized by an inner modulus, and the peripheral portion comprises a peripheral material characterized by a peripheral modulus, wherein the inner modulus is greater than the outer modulus.

In certain embodiments, the inner optic portion comprises a material characterized by an inner modulus from about 100 MPa to about 3000 MPa. In certain embodiments, the inner modulus is from about 200 MPa to about 3000 MPa, from about 200 MPa to about 2000 MPa, from about 200 MPa to about 2000 MPa, from about 200 MPa to about 1000 MPa, and in certain embodiments, from about 200 MPa to about 700 MPa.

In certain embodiments, the peripheral portion comprises a material characterized by a peripheral modulus from about 0.1 MPa to about 10 MPa, from about 0.1 MPa to about 5 MPa, from about 0.5 MPa to about 5 MPa, and in certain embodiments, from about 1 MPa to about 5 MPa.

The materials forming the inner optic portion and the peripheral portion may be polymers, copolymers, homopolymers, graft polymers, or graft copolymers. The materials may comprise a combination of more than one different types of materials. In certain embodiments, the materials may be hydrogels. A hydrogel refers to a cross-linked polymeric material, which is not water-soluble and contains at least 10 wt % water within the polymer matrix when fully hydrated. In certain embodiments, a material forming the inner optic portion and/or the peripheral portion is not a hydrogel and contains less than 10 wt % water.

Examples of suitable materials for forming the inner optic portion include, for example, silicones, fluorosilicones, polyurethanes, polyether block amides, polycarbonates, polymethyl methacrylates, polystyrenes, and acrylonitrile butadiene styrene, polymers of methacrylate and acrylate esters of various alcohols, including aliphatic, aromatic, siloxane-containing, fluorocarbon-containing alcohols, and combinations of any of the foregoing. Such materials for the inner optic portion are characterized by a modulus from about 100 MPa to about 3000 MPa.

Examples of suitable materials for forming the peripheral portion include, for example, silicone, silicone hydrogels, and hydrogels of optically clear materials such as those listed for the inner portion modified with a suitable hydrophilic material such as polyhydroxyethylmethacrylate hydrogels, polyvinylpyrrolidone hydrogels, polyvinylalcohol hydrogels, silicone hydrogels.

Ophthalmic lenses provided by the present disclosure may be manufactured using any suitable contact lens manufacturing technology including, for example, cast molding, injection molding, insert molding, transfer molding, thermoforming, vacuum forming, or a combination of any of the foregoing.

In certain embodiments, the inner optic portion comprising a higher modulus material may be thermoplastic and can be fabricated by injection molding. The inner optic portion may then be inserted into a mold cavity and the peripheral portion formed to retain the inner optic portion. This may be accomplished, for example, using insert molding or cast molding technologies. In certain embodiments, the material forming the peripheral portion also covers the anterior surface, the posterior surface, or both the anterior surface and the posterior surface of the inner portion. Cast molding resins may be, for example, heat cured or radiation cured such as UV cured.

Bimodulus Contact Lenses Comprising a Scaffold

Bimodulus multifocal contact lenses having an inner optic portion with a material having a higher modulus than the material forming the outer peripheral portion can provide refractive correction independent of the spherical orientation on the cornea. The modulus of a material forming the inner optic portion provides a sufficiently rigid structure to provide a spherical posterior lens surface. Any non-spherical portions of the cornea are effectively spanned by the posterior lens surface to define lenticular volumes between the posterior lens surface and the cornea. When filled with tear fluid, the lenticular volumes form a tear lens. Because a bimodulus lens is spherically symmetric, astigmatic error can be corrected regardless of the spherical orientation on the cornea, eliminating the need for alignment or orientation features.

To provide sufficient rigidity of the inner optic portion, the material forming the inner optic portion can be relatively thin and be characterized by a high modulus, or can be relatively thick and be characterized by a lower modulus. Low modulus materials and thin contact lenses generally enhance comfort of contact lens wear. To enhance comfort a high modulus material may be covered with layers of low modulus material. This approach has the advantage that the high modulus material can be retained by low modulus material.

Eye health is promoted by oxygen permeability. For contact lenses it is generally desirable that the oxygen permeability be greater than about 80 Dk. This high oxygen permeability can be difficult to obtain for high modulus materials and/or for thicker cross-sections.

To provide radially symmetric contact lenses capable of correcting presbyopia, contact lenses are disclosed in which the inner optic portion includes a center portion having a scaffold formed from a high modulus material and characterized by a substantially uniform thickness.

The scaffold of the center portion imparts sufficient rigidity to the center optic portion to provide a spherical anterior lens surface for correcting refractive error.

Bimodulus multifocal contact lenses can comprise an inner optic portion, a peripheral portion, an anterior surface, and a posterior surface. An inner optic portion can include an anterior portion, a center portion, and a posterior portion. A center portion can be characterized by a substantially uniform thickness and is embedded between the anterior portion and the posterior portion. The anterior portion, posterior portion, and peripheral portion may be formed from the same material, and the center portion may be formed from a different material. The center portion may also include openings. The anterior surface and the posterior surface of the inner optic portion may be characterized by a radially symmetric profile.

In certain embodiments, the scaffold is a solid material and may be characterized by a substantially uniform thickness.

The scaffold may be configured with openings, holes, channels or other features such that the central portion serves as a scaffold rather than as a continuous sheet of homogeneous material.

The openings can serve several functions including, for example, increasing oxygen permeability, tear flow, and enabling the use of a high modulus material while maintaining a relatively thin cross-sectional surface. Furthermore, the openings can be filled with another optical material such as a low modulus material that can serve to retain and thereby increase the mechanical integrity of the bimodulus contact lens.

The openings in the central portion may be any suitable configuration.

In certain embodiments, round openings having similar diameters can be disposed throughout the center portion. The round openings may be disposed in any suitable configuration and may form a regular or irregular pattern. Each of the round openings may have similar diameters, may have different diameters, or may have a combination of diameters. Round openings having different diameters may be disposed in certain regions of the center portion. For example, the round openings toward the central axis may have a larger diameter than those located toward the outer edge of the center portion.

In certain embodiments, the round openings may have a diameter ranging from 10 μm to 1000 μm including, for example, 50 μm to 500 μm, 100 μm to 500 μm, or 50 μm to 250 μm.

In certain embodiments, the center portion includes a large-diameter opening located in the center with smaller openings disposed toward the outer edge of the center portion. In such embodiments, the center opening may have a diameter from 1 mm to 4 mm.

In certain embodiments, a scaffold comprises a plurality of smaller openings located along circles centered around the center axis of the scaffold. In certain embodiments, the openings can be angled with respect to the cross-sectional thickness of the scaffold. Thus, in certain embodiments, the openings may be substantially perpendicular to the cross-sectional thickness of the scaffold, and in certain embodiments, may be angled with respect to the cross-sectional thickness of the scaffold.

In certain embodiments of a scaffold design, the center portion has wedge-shaped openings forming a hub-and-spoke arrangement. For example, the center portion may include ten wedge-shaped openings. However, any suitable number of wedge-shaped openings may be employed. For example, a center portion may include four wedge-shaped openings.

It can be appreciated that other configurations of openings are possible. In certain embodiments it may be desirable that openings be relatively large to facilitate manufacture and/or to minimize the interface between scaffold.

The number, size, and/or shape of the openings may be selected to provide sufficient rigidity and oxygen permeability to the inner optic portion of the ophthalmic lens. The number, size, and/or shape of the openings may also be selected to facilitate manufacturing. For example, depending on whether the center portion is fabricated using injection molding, compression molding, cast molding, or other suitable molding technology, the design may be selected to facilitate the manufacturability and quality of the part.

The openings in the center portion may be distinguished from openings used to enhance tear flow and oxygen permeability. Such openings that extend through the thickness of a contact lens can generally be characterized by a diameter less than 100 µm. In contrast, the openings used to provide high modulus scaffolds of the present disclosure can be larger such that, in certain embodiments, the scaffold itself is only a small portion of the inner optic portion.

The center scaffold is primarily configured to provide mechanical structure. In certain embodiments, the center scaffold is not configured to provide an optical function.

In certain embodiments, the center scaffold section is characterized by a substantially uniform thickness. A substantially uniform thickness refers to a thickness that varies less than ±2% across the profile, ±5% across the profile, and in certain embodiments less than ±10% across the profile, where percent is based on the nominal thickness of the scaffold. In certain embodiments, the center scaffold portion may be characterized by a non-uniform thickness; however, the effect of the non-uniform thickness is not to affect the optical properties of the inner optic portion. For example, the center scaffold portion may be thicker toward the edge or may be thicker toward the center. However, the optical properties of contact lenses provided by the present disclosure are determined by the spherically-shaped anterior and posterior lens surfaces.

In certain embodiments, the anterior portion is characterized by a thickness from about 25 µm to about 250 µm, the posterior portion is characterized by a thickness from about 25 µm to about 250 µm, and in certain embodiments, both the anterior portion and the posterior portion are characterized by a thickness from about 25 µm to about 250 µm.

In certain embodiments, the scaffold can be characterized by a thickness from about 50 µm to about 300 µm, from about 75 µm to about 300 µm, from about 100 µm to about 275 µm, from about 125 µm to about 250 µm, and in certain embodiments, from about 125 µm to about 225 µm.

In certain embodiments, a scaffold is characterized by a curvature configured to fit within a smooth cross-section profile of the contact lens. The scaffold may have a diameter smaller than the optical region of the cornea, larger than the optical region of the cornea, or about the same diameter as the optical region of the cornea.

In general, the thickness, diameter, curvature, and design of the scaffold are configured to maintain a spherically symmetric posterior surface of the lens. The lens may deform upon blinking but may sufficiently recover so as not to significantly affect vision of the eye.

In certain embodiments, the maximum thickness of the inner optic portion is from about 100 µm to about 500 µm, in certain embodiments, from about 150 µm to about 350 µm, from about 200 µm to about 300 µm, and in certain embodiments, from about 225 µm to about 275 µm.

In certain embodiments, the anterior portion and the posterior portion are characterized by an oxygen permeability from about 10 Dk to about 500 Dk, from about 50 Dk to about 400 Dk, from about 50 Dk to about 300 DK, and in certain embodiments from about 50 DK to about 100 Dk.

In certain embodiments, the material forming the scaffold is characterized by an oxygen permeability from about 0 Dk to about 300 Dk, from about 0 Dk to about 100 DK, and in certain embodiments, from about 0 Dk to about 50 Dk.

In certain embodiments, the high modulus scaffold represents from about 20 vol % to about 80 vol % of the center portion, from about 30 vol % to about 70 vol %, from about 30 vol % to about 60 vol %, and in certain embodiments, from about 30 vol % to about 50 vol % of the total volume of the center portion.

In certain embodiments, the modulus of the material forming the scaffold ranges from 300 MPa to 3000 MPa, from 500 MPa to 2000 MPa, from 800 MPa to 1800 MPa, and in certain embodiments from 1000 MPa to 1400 MPa.

In certain embodiments, a center portion is characterized by a rigidity from about 1E9 MPa-µm$^3$ to 1E11 MPa-µm$^3$, from 1E9 MPa-µm$^3$ to 5E10 MPa-µm$^3$, from 1E9 MPa-µm$^3$ to 2E10, from 2E9 to 2E10 MPa-µm$^3$, from 4E9 MPa-µm$^3$ to 2E10 MPa-µm$^3$, from 6E9 MPa-µm$^3$ to 2E10 MPa-µm$^3$, and in certain embodiments, from 8E9 MPa-µm$^3$ to 2E10 MPa-µm$^3$.

In certain embodiments, the contact lens is configured to have a maximum thickness less than about 400 µm and an inner optic portion characterized by a rigidity from about 1E9 MPa-µm$^3$ to about 1E11 MPa-µm$^3$.

In certain embodiments, the contact lens is configured to have a maximum thickness less than about 350 µm and an inner optic portion characterized by a rigidity from about 1E9 MPa-µm$^3$ to about 5E10 MPa-µm$^3$.

In certain embodiments, the contact lens is configured to have a minimum thickness less than about 300 µm and an inner optic portion characterized by a rigidity from about 1E9 MPa-µm$^3$ to about 2E10 MPa-µm$^3$.

The high modulus material is formed into a disc like part or scaffold that can be embedded in the soft material. The part made from the high modulus material is of a substantially uniform thickness across its diameter, meaning that it has no optical power by itself. The anterior and posterior surfaces of the inner optic portion can be made from the low modulus material and dictate the optics of the system. The scaffold may be a continuous structure with smooth surfaces or it may be modified with uniform through holes, non-uniform through holes, a spoke-like pattern, an open-cell foam, or other pattern that permits gas flow while maintaining structural integrity. The material may be removed such that the through holes are oriented normal to the surface of the scaffold or diagonally oriented at any angle. The open space created by removing material from the scaffold can be filled with a low modulus material. This will allow for the use of low oxygen permeable materials as the high modulus material. The lower the oxygen permeability of the rigid material, the more material can be removed in order to create a part with sufficient oxygen permeability. As more material is removed from the scaffold, its ability to reinforce the optical shape formed by the soft material can decrease. Therefore, a balance can be made in material modulus and oxygen permeability to design an oxygen permeable reinforcing structure made from the high modulus material. Oxygen transmissibility of an inner optic portion having a rigid scaffold and low modulus anterior, posterior and filling portions can be estimated using the Equation (1) and Equation (2):

$$\frac{Dk}{t} = 100 * \left( \frac{s_b}{\left(\frac{t_a}{Dk_a} + \frac{t_b}{Dk_b} + \frac{t_d}{Dk_d}\right)} + \frac{s_c}{\left(\frac{t_a}{Dk_a} + \frac{t_c}{Dk_c} + \frac{t_d}{Dk_d}\right)} \right) \quad (1)$$

$$\text{Rigidity} = t_t^3 (E_a * f_a + s_a * E_b * f_b + s_c * E_c * f_c + E_d * f_d) \quad (2)$$

$Dk_x$=Oxygen Permeability of material "x" (Fatt Units)
$t_x$=thickness of material "x" (microns) ($t_t$=total thickness of system)

$f_x = t_x/t_t$ $s_x$=fractional amount of material "x" that exists across thickness $t_x$ (for an un-modified disc: $s_x$=1)

$E_x$=Young's Modulus of Material "x."

The results of example calculations are shown in Table 1.

In general, low modulus materials are characterized by high oxygen permeability such as oxygen permeability from about 10 Dk to about 500 Dk, and in certain embodiments from about 100 Dk to 400 Dk.

In general, high modulus materials are characterized by low oxygen permeability such as less than 300 Dk, less than 200 Dk, less than 100 Dk, less than 50 Dk, and in certain embodiments, less than 10 Dk.

In general, for a continuous wear contact lens it is desirable that the oxygen transmissibility be at least 50 Dk/t, at least 80 Dk/t, at least 90 Dk/t, and in certain embodiments, at least 100 Dk/t.

To reduce optical artifacts it is desirable that the refractive index of the material forming the scaffold be closely matched to the refractive index of the material filling the openings and forming the anterior portion and the posterior portion of the inner optic portion. For example, in certain embodiments, the difference in the refractive index is less than 0.03, less than 0.025, less than 0.02, less than 0.015, less than 0.010 and in certain embodiments, less than 0.005.

The material forming the scaffold and the material forming the anterior portion, posterior portion, and the filler portion should have similar indices of refraction in order to minimize internal reflections within the part. For example, a Boston EO RGP has a refractive index of 1.429 (Modulus=1600 MPa) can be used with a soft material, for example lotrafilcon A that has a refractive index of 1.43. If using the Boston Equalens II (refractive index=1.423) a soft material such as hefilcon B (refractive index 1.42) can be used.

The materials forming the scaffold and the materials filling the openings in the scaffold, the anterior portion, and the posterior portion of the inner optic portion of the contact lens can be selected to have similar chemistries such that covalent bonds form between the dissimilar materials. For example, the low modulus material and the high modulus material forming the scaffold may be silicon-based or may contain silicon. Thus, in certain embodiments, the scaffold may be formed from a blend of silicon and other material.

Alternatively, to ensure adhesion between the scaffold and the surrounding material the surface of the scaffold may be treated to enhance adhesion such as using plasma treatment or other suitable treatment method.

Contact lenses formed from dissimilar hydrous material can be difficult to manufacture because of differential swelling of the materials during hydration. Therefore, it can be desirable to select the low modulus and high modulus materials to exhibit similar swelling when hydrated. Alternatively, to avoid or at least minimize problems associated with differential swelling, the low modulus materials and the high modulus materials can be selected to be non-hydrous such that they exhibit minimal swelling when hydrated.

Eye health is promoted by the presence and flow of tear fluid along the surface of the cornea. Because the contact lenses provided by the present disclosure are spherically symmetric and are configured to correct astigmatic error independent of the orientation on the cornea, the lenses can freely move and thereby promote the flow and exchange of tear fluid across the surface of the cornea. The scaffold can further help to center the contact lens on the cornea following blinking. Alternatively, or in addition to, fenestrations may be provided through the contact lens proximate to the inner optic region and/or in the peripheral region to further promote the flow and exchange of tear fluid. The fenestrations may further serve to maintain a reservoir of tear fluid within the lenticular volume and thereby support the spherical profile of the posterior surface of the contact lens.

The base curve and the spherical power of the lens can be independent of the shape of the scaffold.

The material forming the center scaffold portion can be characterized by a refractive index similar to that of the other materials forming the inner optic portion of the contact lens. In certain embodiments, the material forming the center scaffold portion can be characterized by a refractive index that is similar to that of the cornea such as, for example, from about 1.4 to about 1.5, from about 1.42 to about 1.48, and in certain embodiments, from about 1.43 to about 1.47.

The openings in the center scaffold portion can be filled with an interstitial material. The interstitial material can generally be characterized by a lower modulus and a higher oxygen permeability than the modulus and oxygen permeability of the center scaffold material. In addition, the material filling the openings in the scaffold can have a refractive index that is substantially similar to the material forming the scaffold. For example, in certain embodiments the material filling the openings in the scaffold can be characterized by a refractive index from about 1.4 to about 1.6.

In addition to the center scaffold portion, the inner optic portion includes at least one layer of material anterior to the center scaffold portion, and at least one layer of material posterior to the center scaffold portion. The materials located anterior and posterior to the center scaffold portion may be the same or may be different materials. For ease of fabrication, in certain embodiments, the materials located anterior and posterior to the center scaffold portion can be the same materials.

In certain embodiments, the material filling the openings in the scaffold will be the same as the material forming the anterior and/or posterior materials of the inner optic portion.

In certain embodiments, the material forming the anterior and/or posterior materials of the inner optic portion will extend to the peripheral portion and in certain embodiments will be the same material as the peripheral portion.

Material forming the anterior and/or posterior portions of the inner optic portion may be characterized by a modulus from 0.1 MPA to 10 MPa, from 0.1 MPa to 5 MPa, or in certain embodiments from 0.1 to 2 MPa.

In certain embodiments, the material forming the anterior and/or posterior portions of the inner optic portion may be formed from a material characterized by a high oxygen permeability (Dk, cm·mL $O_2$/sec·mL·mm Hg) such as from $100 \times 10^{-11}$ to $500 \times 10^{-11}$, from $200 \times 10^{-11}$ to $500 \times 10^{-11}$, from $250 \times 10^{-11}$ to $450 \times 10^{-11}$, from $300 \times 10^{-11}$ to $400 \times 10^{-11}$, and in certain embodiments, about 350.

In certain embodiments, lenses provided by the present disclosure are characterized by a high oxygen transmissibility (Dk/t) such as at least about $50 \times 10^{-9}$, at least about $80 \times 10^{-9}$, at least about $100 \times 10^{-9}$, and in certain embodiments, at least about $120 \times 10^{-9}$.

The material forming the anterior and/or posterior portions of the inner optic portion may be hydrous or in certain embodiments may be anhydrous. An anhydrous material refers to a material having a water content, when fully hydrated, less than 10 wt %, less than 5 wt %, and in certain embodiments, less than 2 wt %. A hydrous material refers to a material having a water content, when fully hydrated, greater than 10 wt %.

In certain embodiments, a lens may comprise silicone or silicone hydrogel having a low ionoporosity. For example, a lens may comprise silicone hydrogel or silicone comprising a low ion permeability, and the range of water can be from about 5% to about 35%, such that the Dk is $100 \times 10^{-11}$ or more. In certain embodiments, the low ion permeability may comprise an Ionoton Ion Permeability Coefficient of no more than about $0.25 \times 10^{-3}$ cm$^2$/sec, for example no more than about $0.08 \times 10^{-3}$ cm$^2$/sec.

An ophthalmic lens may comprise a wettable surface coating disposed on at least the upper side (anterior surface) of the lens, such that the tear film of the patient is smooth over the lens and the patient can see. The wettable surface coating may comprise a lubricious coating for patient comfort, for example to lubricate the eye when the patient blinks. The wettable coating may comprise a contact angle no more than about 80 degrees. For example, the coating may comprise a contact angle no more than about 70 degrees, and the contact angle can be within a range from about 55 degrees to 65 degrees to provide a surface with a smooth tear layer for vision. For example, the wettable coating can be disposed both an upper surface and a lower surface of the lens. The upper surface may comprise the wettable coating extending over at least the inner optic portion.

A wettable coating may comprise one or more of many materials. For example, the wettable coating may comprise polyethylene glycol (PEG), and the PEG coating can be disposed on Parylene™. Alternatively, the wettable coating 134 may comprise a plasma coating, and the plasma coating may comprise a luminous chemical vapor deposition (LCVD) film. For example, the plasma coating comprises at least one of a hydrocarbon, for example $CH_4$, $O_2$ or fluorine-containing hydrocarbon, for example $CF_4$ coating. Alternatively or in combination, the wettable coating may comprise a polyethylene glycol (PEG) coating or 2-hydroxyethylmethacrylate (HEMA). For example, the wettable coating may comprise HEMA disposed on a Parylene™ coating, or the wettable coating may comprise N-vinylpyrrolidone (NVP) disposed on a Parylene™ coating.

In certain embodiments, ophthalmic lenses provided by the present disclosure are configured to correct refractive error such as astigmatism. The lenses provide a smooth spherical anterior surface and minimize lens-induced distortions by reducing flexure of the inner optical portion and by maintaining lens centration during wear. Reduced flexure of the inner optical portion can in part be accomplished by increasing the rigidity of the inner portion and by creating a tear lens. Centration of the inner optical portion minimizes astigmatic and prismatic effects caused by tilting of the optic and also minimizes edge distortion.

Ophthalmic lenses provided by the present disclosure can achieve visual correction at least equivalent to that of soft toric contact lenses and achieve a superior comfort level compared to soft toric contact lenses. Furthermore, because the ophthalmic lenses provided by the present disclosure are radially symmetric, fitting to an eye of the patient involves only accommodating the spherical correction and an inventory of lenses for correcting cylindrical error is not required.

Ophthalmic lenses provided by the present disclosure include an inner optic portion configured to be disposed over the optical region of the cornea and a peripheral or outer portion that is disposed radially outward of the inner portion. An ophthalmic lens includes a posterior surface that extends along the inner portion of the lens and is adjacent an eye when applied to an eye of a patient. An ophthalmic lens also includes an anterior surface that extends along the outer surface of the lens and opposite the posterior surface. In general, the inner portion of a lens is configured to improve vision and the peripheral portion is configured to improve comfort. However, the configuration of the inner portion can play a role in determining patient comfort, and the peripheral portion, at least in part, by maintaining centration of the inner optical portion on the optical portion of the cornea during wear enhances the visual outcome.

The inner optical portion of a lens can be configured so that engagement of the posterior surface against the eye deforms the posterior surface so that the posterior surface of the inner portion has a shape diverging from the refractive shape of the epithelium and optical portion of the cornea. The anterior surface of the inner portion of the ophthalmic lens provides a spherical surface to correct a patient's vision.

In certain embodiments, the inner optical portion of a lens is characterized by a diameter from about 5 mm to about 10 mm, from about 7 mm to about 9 mm, from about 7.5 mm to about 8.5 mm, from about 7.8 mm to about 8.2 mm, and in certain embodiments, about 8 mm. The anterior inner portion of a lens can be characterized by a substantially spherical profile without a cylindrical component.

In certain embodiments, the material forming a lens including both the inner and outer portions have low water content and can be characterized by low water or ion permeability. In certain embodiments, the water content is less than about 5%, less than about 4%, and in certain embodiments, less than about 3%. In certain embodiments, the material forming a lens has a water content less than about 1%, less than about 0.6%, and in certain embodiments, less than about 0.3%. In certain embodiments, the material less than about $0.4 \times 10^{-6}$ cm$^2$/sec, less than about $0.2 \times 10^{-6}$ cm$^2$/sec, and in certain embodiments, less than about $0.1 \times 10^{-6}$ cm$^2$/sec.

A peripheral portion is disposed radially outward of the inner portion of an ophthalmic lens. In general, the peripheral portion retains the inner portion and can be characterized by approximately the same thickness as the inner portion at the interface between the inner and peripheral portions, and the thickness of the peripheral portion tapers toward the peripheral edge. In certain embodiments, the diameter of the peripheral edge is from about from about 12 mm to 16 mm, 13 mm to about 16 mm, from about 13.5 mm to about 15.5 mm, from about 14 mm to about 15 mm, and in certain embodiments, from about 14.2 mm to about 14.8 mm.

The peripheral portion can be characterized by a lower rigidity than the inner portion and can be formed from a material having a lower modulus than that of the inner portion. In certain embodiments, the material forming the peripheral portion can be characterized by a modulus from about 0.5 MPa to about 2.0 MPa, from about 0.8 MPa to about 1.7 MPa, from about 1.0 MPa to about 1.4 MPa, and in certain embodiments, about 1.2 MPa.

The peripheral portion is configured to provide tear flow between the anterior surface of the lens and the epithelium. In certain embodiments, the peripheral portion comprises a plurality of fenestrations extending from the anterior to the posterior surface of the peripheral portion. In certain embodiments, the plurality of fenestrations are disposed at a radius from a central optical axis of the ophthalmic lens such as for example, at a radius proximate to the interface between the inner portion and the peripheral portion. The plurality of fenestrations may be symmetrically or asymmetrically disposed. The fenestrations may be configured to pump tear liquid between the peripheral portion and the epithelium when the eye blinks so as to maintain a tear layer between the posterior surface of the lens and the epithelium and/or across the anterior surface of the lens. In certain embodiments, the plurality of fenestrations may be configured to facilitate removal of the lens from the eye. In certain embodiments, the plurality of fenestrations may be configured to facilitate air dissipation if air bubbles are trapped underneath the lens. In certain embodiments, the plurality of fenestrations facilitates the removal of air bubble entrapped within any lenticular volumes following application of a lens to a patient's eye. The plurality of fenestrations may facilitate both removal of the lens form the eye and dissipation of air bubbles. In certain embodiments, the plurality of fenestrations improves the reproducibility of visual outcome in a population of patients wearing the lens compared to the visual outcome in a population of patients wearing a comparable lens without fenestrations.

In certain embodiments, the inner portion, the peripheral portion, or both the inner and peripheral portions of an ophthalmic lens provided by the present disclosure are radially symmetric. In certain embodiments, the anterior surface of the inner portion and the posterior surface of the inner portion are radially symmetric.

In certain embodiments of ophthalmic lenses provided by the present disclosure, the inner portion and the peripheral portion are configured to allow movement of the lens relative to the eye in response to blinking of the eye. In such embodiments, an ophthalmic lens is configured such that the inner optical portion centers on the optical portion of the cornea following blinking. During blinking the inner portion, the peripheral portion, or both the inner and peripheral portions may deform and/or move with respect to the center optical axis of the cornea. When an ophthalmic lens is worn by a patient, depending at least in part by the shape of the patient's eye and the configuration of the lens, the ophthalmic lens may move during blinking or may exhibit only micro-movement. However, in certain embodiments, a lens is not configured to resist movement such that, for example, the peripheral edge of the lens is not configured to fixedly engage the epithelium or sclera such that the inner portion resists movement relative the cornea.

Ophthalmic lenses provided by the present disclosure may be manufactured using any suitable contact lens manufacturing technology including, for example, cast molding, injection molding, insert molding, transfer molding, thermoforming, vacuum forming, or a combination of any of the foregoing.

In certain embodiments, the inner optic portion comprising a higher modulus material may be thermoplastic and can be fabricated by injection molding. The inner optic portion may then be inserted into a mold cavity and the peripheral portion formed to retain the inner optic portion. This may be accomplished, for example, using insert molding or cast molding technologies. In certain embodiments, the material forming the peripheral portion also covers the anterior surface, the posterior surface, or both the anterior surface and the posterior surface of the inner portion. Cast molding resins may be, for example, heat cured or radiation cured such as UV cured.

Scaffolds provided by the present disclosure may be fabricated using any suitable technology. The technology may be selected as appropriate for the material used to form the scaffold.

For example, scaffolds may be fabricated using injection molding, compression molding, thermoforming, a lathe, or cast molding.

The material forming the scaffold may be a thermoplastic or may be a curable liquid. A curable material may be curable by heat or by radiation.

The openings in the scaffold may be formed at the time the scaffold is fabricated or may be machined after the scaffold is formed. The openings may be incorporated into the mold design. The openings may also be machined after the part is formed using, for example, laser machining, die cutting, or other suitable method.

To fabricate a contact lens, the scaffold may be first positioned in a mold cavity and then a second material formed around the scaffold by injection molding, compression molding, cast molding or other suitable molding technology. The second material forms the anterior and posterior surface of the inner optic portion, fills the openings in the scaffold, and also forms the peripheral portion of the contact lens.

In certain embodiments, the low modulus material may be a thermoplastic and the contact lens formed by insert molding the scaffold.

For high volume manufacturing it may be desirable to position the scaffold in a cast mold, fill the mold with a liquid low modulus material, and cure the low modulus material using actinic radiation such as ultraviolet radiation.

Presbyoptic Correction

The bimodulus ophthalmic lenses provided by the present disclosure may be used as a platform for the correction of presbyopia. A bimodulus contact lens platform for correcting astigmatic error can be adapted to correct for presbyopia. Bimodulus contact lenses provided by the present disclosure may be adapted to incorporate a suitable feature or features for correcting presbyopia. In certain embodiments, features used to correct for presbyopia are incorporated into the anterior surface of a bimodulus contact lens.

Presbyoptic correction optics address both distance vision and near vision, and in certain embodiments, address intermediate vision. In certain embodiments, the transitions between regions accommodating the different types of vision may be discreet or discontinuous, may be continuous, or may comprise regions characterized by discontinuous and other regions characterized by continuous transitions.

When a person views near objects, the eye accommodates the divergent, rather than parallel, light arriving from the near object. The act of accommodation by the human eye results in a physical change in shape of the crystalline lens within the eye, the flexure of this lens causes the incoming divergent light emitted by near objects to re-converge and focus on the retina. Accommodation increases the convergence of light waves by causing the lens surfaces to be more steeply curved, which in turn adds focal power to the optical system of the eye. The closer an object is viewed, the greater the accommodative demand placed on the eye. As the human crystalline lens ages, it slowly loses its gel-like flexibility. Although the process goes unnoticed for the better part of four decades, the lens body expands in thickness and hardens, losing the ability to change shape with a resulting loss in accommodative ability. This condition is known as presbyopia. Typically, corrective lens wearers begin to notice presbyopia near the end of the fourth decade of life and then begin to require more than one lens in order to see clearly and efficiently at all distances. The convergent focal power requirement of this multiple lens system then typically increases gradually over the next fifteen years.

Any suitable lens design or configuration for correcting presbyopia may be combined with the bimodulus contact lenses provided by the present disclosure. Thus, in certain embodiments, a contact lens provided by the present disclosure comprises a combination of materials effective in correcting astigmatic error and features for correcting presbyopia. In certain embodiments, the features for correcting presbyopia are imparted to the anterior surface of a lens. In certain embodiments, the features for correcting presbyopia are concentric or radially symmetric around the geometric center or center optical axis of the lens. In the latter embodiments, the lens will be radially symmetric and thereby obviate the need to orient the lens with respect to an eye.

Multifocal contact lens designs for correcting presbyopia include concentric bifocal, translating, concentric, and aspheric designs.

Bifocal designs can be a concentric bifocal pattern in which near correction is in a small circle at the center of the lens, surrounded by a larger circle containing the distance correction. The distance correction may be placed in the center with the near vision correction in the outer ring.

For example, a bimodulus contact lens may incorporate any of a number of multifocal corrections including, bifocal and progressive correction. Simultaneous image designs such as concentric and aspheric designs focus both distance and near vision images on the pupil at the same time. Concentric designs are characterized by alternating radially symmetric portions corrected for distance vision or for near vision. Aspheric designs are characterized by an aspheric shape intended to provide smooth transitions between portions correcting for distance vision and for near vision.

Multifocal contact lenses for correcting presbyopia may have a bifocal design with two distinct optical powers for distance vision and for near vision, or may have a multifocal design with a gradual change in optical power for a natural visual transition from distance vision to near vision.

Multifocal contact lens designs include, for example, refractive, diffractive, and a combination of refractive and diffractive optics. The designs can include one or more spherical surfaces, aspherical surfaces or a combination of spherical and aspherical surfaces. The features used to impart refractive and/or diffractive characteristics to a lens may be on the posterior surface, the anterior surface of the lens, or on both the posterior and anterior surfaces of a lens. In certain embodiments, a multifocal contact lens comprises presbyopia-correcting features on the anterior surface of the contact lens.

In certain embodiments, an anterior surface of a lens may have a central optic zone with at least two concentric annular zones of spherical power. The central optic zone may provide near or distance optical power. By "distance optical power" and "near optical power" is meant the power required to correct distance vision and near vision power, respectively. The optical power of one of the annular zones may be substantially equal to that of the distance optical power and that of the other annular zone may be substantially equal to that of the near vision power. The anterior surface of the lens may have additional annular zones with distance optical power, near optical power, intermediate optical power, or power in a range between that of the distance and near optical power, or combinations thereof. For example, the surface may have three to five additional annular zones of alternating distance and near vision power.

In certain embodiments, the front surface optical zone may include one or more progressive power zones. By "progressive power zone" is meant a continuous, aspheric zone having a distance vision power region and a near vision power region, and a transition region of increasing or decreasing dioptric power connecting the distance and near regions. In certain embodiments, a bimodulus multifocal contact lens provided by the present disclosure have any of a variety of corrective optical characteristics incorporated onto the surfaces in addition to distance and near optical powers, such as, for example, cylinder power. A multifocal lens may include a combination of zones of bifocal power characteristic and progressive power characteristic to provide continuous foci from far through intermediate to near.

Correction of presbyopia may be accomplished using refractive optics, diffractive optics, or a combination thereof.

The power of a spherical lens is a combination of powers of its spherical surfaces and is reciprocal of the lens focal length: $P=(n'-n)/R^1+(n'-n)/R^2=n/f$, where $R^1$ is a front surface radius of curvature, and $R^2$ is a back surface radius of curvature. Thus, a multifocal lens may include zones of constant radii, one for far and another for near power to achieve a bifocal characteristic or may include one or more zones having an aspheric profile with continually varying power to achieve a progressive power characteristic. The multifocal characteristic may be achieved by shaping the anterior surface of a bimodulus contact lens to produce the desired multifocal properties.

The various multifocal optic zones may be disposed in annular zones radially symmetric with the center optic axis of a lens. The optic zones may be confined to the inner portion, the peripheral portion, or may include both the inner portion and peripheral portion of a lens. The multifocal optic zones may be separated by annular non-optic zones. For example, in certain embodiments, a bimodulus multifocal lens includes a center zone encompassing the center optic axis of the lens characterized by a distance optical power for correcting distance vision and one or more annular zones surrounding the central zones characterized by a near optical power for correcting near vision, and in certain embodiments, one or more annular zones characterized by an intermediate optical power for correcting intermediate vision.

Each vision zone may be characterized by a spherical surface or by an aspherical surface. The optical zones may be discrete with each optical zone being characterized by a spherical profile having a distinct optical power, or may be characterized by an aspheric shape having a continuous optical power. For example, in certain embodiments, a central area of a bimodulus contact lens may have a spherical surface, and an annular area may be characterized by an aspherical surface. The spherical surface of the central area can provide a single dioptric power, and the aspherical surface can provide a transition of optical powers to provide a gradual correction of intermediate and near vision. The transition provided by the aspherical surface can be achieved by gradually decreasing the radii in the annular area from a region adjacent the perimeter of the central area to the outer edge of the annular area. It can be appreciated that because the radius of curvature at the inner perimeter of the annular area is almost equal to the radius of curvature of the central area, a sharp transition between the central area and the annular area may not be noticeable. In addition, because of the change in curvature in the annular area, the annular area represents a progressive aspheric region of the lens.

In certain embodiments, a multifocal lens may be designed to correct vision of an emerging presbyope such as, for example, a person who requires an add power of +1.25 diopters or less. Thus, in certain embodiments, a bimodulus multifocal lens can include a central area that includes an add power no greater than +1.25 diopters. In certain embodiments, a central area of a bimodulus multifocal lens includes an add power from about +0.25 diopters to about +1.25 diopters.

In certain embodiments, a bimodulus multifocal lens may provide a spherical power from about +4.00 diopters to about −6.00 diopters. For example, a lens may have a single spherical power between +4.00 diopters and −6.00 diopters. In certain embodiments, a lens may have a spherical power from +4.00 diopters to −6.00 diopters in 0.25 diopter increments.

The multifocal vision correcting features may be provided on the anterior surface of a bimodulus lens, on the posterior surface of a bimodulus lens, or on both the anterior and posterior surface of a bimodulus lens. In certain embodiments, the multifocal vision correcting features are provided on the anterior surface of a bimodulus lens. In such embodiments, the posterior surface can be configured to have a single base curve, such as a spherical curve, or can otherwise be shaped to fit comfortably on the eye.

In certain multifocal designs for correcting presbyopia, adjacent power zones have boundaries that induce diffraction and other optical aberrations, which can degrade visual acuity. Various smoothing and transition methods have been developed to mitigate this problem. Various refractive shapes can be used to improve simultaneous focus of bimodulus lenses. Aspheric multifocal lenses employ multiple zones of conicoid surfaces. In concentric designs adjacent surfaces of revolution of differing shapes can be mathematically smoothed to provide addition power that increases radially on the lens surfaces.

Presbyopia may also be corrected using diffractive optics. Periodic diffractive structures can diffract light simultaneously into several directions, also typically known as diffraction orders. In multifocal intraocular lenses, two diffraction orders are utilized to provide a patient with two optical powers, one for distance vision and the other for near vision. Such diffractive intraocular lenses are typically designed to have an "add" power that provides a separation between the far focus and the near focus. In this manner, a diffractive intraocular lens can provide a patient in whose eye the lens is implanted with vision over a range of object distances. For example, a diffractive lens can provide optical power correction and also some level of pseudo-accommodation.

Periodic grating structures or combination of diffraction grooves may result in light waves constructive interferences at multiple locations called diffraction orders. The diffraction grating provides multiple diffraction foci at the locations of its diffraction orders. The diffraction grating can be superimposed onto refractive lens such that the refractive lens aspect of a diffractive lens controls location of zero-order diffraction utilized for far vision in a multifocal diffractive lens.

In a diffractive lens, the diffraction grating controls locations of high orders diffraction and (−1)-order is utilized for near vision. The Add power for near vision is defined as a separation between (−1)-order and zero-order diffraction expressed in diopters. The groove widths of the diffraction grooves control the Add power with smaller groove widths corresponding to a larger Add power.

In certain embodiments of diffractive lenses for correcting presbyopia, periodic grooves in the form of a sawtooth-shaped grating are formed into an anterior refraction surface of a bimodulus lens with an appropriate depth to provide a diffraction surface.

Diffractive multifocal lenses can make use of a material having a given refractive index and a surface curvature to provide a refractive power. Diffractive lenses may also be characterized by a diffractive profile that confers the lens with a diffractive power that contributes to the overall optical power of the lens. The diffractive profile can be characterized by a number of diffractive zones. The diffractive power can be related to the properties of these zones, for instance the number, shape, size, and position. In certain embodiments, the diffraction zones can be annular lens zones, or echelettes, spaced about the optical axis of the ophthalmic lens. Each echelette may be defined by an optical zone, a transition zone between the optical zone and an optical zone of an adjacent echelette, and an echelette geometry. The echelette geometry includes a diameter and a shape or slope of the optical zone, as well as a height or step height of the transition zone. The diameters of the echelettes largely determine the power(s) of the lens and the step height of the transition zones largely determines the light distribution between the different add powers. The grooves or echelettes form a diffractive profile, which may be, for example, saw-toothed or stepped, on one of the surfaces of the lens.

A multifocal diffractive profile of the lens can be used to mitigate presbyopia by providing two or more optical powers, for example, one for near vision and one for far vision. These multifocal lenses may be in the form of a multifocal contact lens, such as a bifocal contact lens.

In certain embodiments, a bimodulus multifocal ophthalmic lens includes an anterior surface characterized by a refractive profile. The anterior surface, the posterior surface, or both the anterior and posterior surfaces may also be characterized by a diffractive profile imposed on the refractive profile. The diffractive profile may include a plurality of echelettes with associated step heights that are substantially equal to one another. The diffractive profile may be characterized by a zeroth diffractive order and a first diffractive order having a diffraction add power. The zeroth and first diffraction orders have diffraction efficiencies that change with radius from the optical axis of the lens.

Several variations of diffractive contact lenses have been developed. The diffraction grooves or echelettes may be characterized by abrupt discontinuous transitions or blazes. In certain embodiments, the transitions between the diffraction grooves may be chamfered. In other designs, apodized diffractive zones are used to enhance image contrast. In certain embodiments, a diffractive profile is characterized by a continuous function over a plurality of echelettes.

In certain embodiments, a multifocal corrective pattern can be located concentrically around the central optical axis or geometric center of a bimodulus multifocal lens. In certain embodiments, the multifocal corrective pattern is radially symmetric about the central optical axis or geometric center of a lens. In certain embodiments, multifocal corrective features are not concentrically arranged around a geometric center of a lens and are instead located at a peripheral portion of a contact lens.

While the exemplary embodiments have been described in some detail, by way of example and for clarity of understanding, those of skill in the art will recognize that a variety of modifications, adaptations, and changes may be employed. Hence, the scope of the present invention should be limited solely by the appended claims.

What is claimed is:

1. An ophthalmic lens for correcting presbyopia of an eye, the eye having a cornea characterized by a refractive shape extending across an optical region of the cornea, the ophthalmic lens comprising:
    an inner optic portion and a peripheral portion disposed radially outward of the inner optic portion, wherein,
        the inner optic portion is configured to be disposed over the optical region of the cornea;
        the inner optic portion is characterized by an inner rigidity and the peripheral portion is characterized by a peripheral rigidity;

the inner rigidity is greater than the peripheral rigidity; and the inner rigidity is from about 1E8 MPa-μm³ to about 1E11 MPa-μm³; and an anterior surface and a posterior surface opposite the anterior surface, wherein,
  a portion of the anterior surface is configured to correct presbyopia; and
  the posterior surface is configured to provide one or more lenticular volumes between the posterior surface and the optical region of the cornea.

2. The ophthalmic lens of claim 1, wherein the posterior surface is characterized by a substantially spherical shape.

3. The ophthalmic lens of claim 1, wherein the anterior surface configured to correct presbyopia comprises an aspheric optical power profile.

4. The ophthalmic lens of claim 1, wherein the anterior surface configured to correct presbyopia comprises:
  multiple zones of conicoid surfaces;
  a central region characterized by a low optical power and an optical step surrounding the central region;
  refractive multifocal optics;
  alternating concentric distance focus regions and near focus regions; or
  diffractive multifocal optics.

5. The ophthalmic lens of claim 1, wherein the anterior surface configured to correct presbyopia comprises a central apodized diffractive region and a refractive outer region surrounding the central apodized diffractive region.

6. The ophthalmic lens of claim 1, wherein the anterior surface configured to correct presbyopia comprises refractive multifocal optics, diffractive multifocal optics, or a combination thereof.

7. The ophthalmic lens of claim 1, wherein the anterior surface configured to correct presbyopia comprises aspheric optics.

8. The ophthalmic lens of claim 1, wherein the inner optic portion is configured to provide at least one lenticular volume between the posterior surface and the optic portion of the cornea.

9. The ophthalmic lens of claim 1, wherein the inner optic portion is characterized by a maximum thickness from about 50 μm to about 900 μm.

10. The ophthalmic lens of claim 1, wherein,
  the inner optic portion comprises a first portion comprising a material characterized by a first modulus;
  the first portion comprises a first material characterized by a modulus from about 20 MPa to about 2,000 MPa; and
  the first portion is characterized by a maximum thickness from about 50 μto about 900 μm.

11. The ophthalmic lens of claim 10, wherein,
  the inner optic portion comprises a posterior portion, an anterior portion, or both a posterior portion and an anterior portion;

the posterior portion is disposed posteriorly to the first portion and the anterior portion is disposed anteriorly to the first portion;
the posterior portion comprises a posterior material characterized by a posterior modulus;
the anterior portion comprises an anterior material characterized by an anterior modulus;
wherein each of the posterior modulus and the anterior modulus is less than the first modulus;
each of the posterior modulus and the anterior modulus is from about 0.1 MPa to about 10 MPa;
each of the posterior portion and the anterior portion is characterized by a thickness from about 5μm to about 100 μm; and
each of the posterior material and the anterior material comprises a hydrogel.

12. The ophthalmic lens of claim 1, wherein the inner optic portion is characterized by a shape configured to provide a spherical power from +10.00 D to −10.00D.

13. The ophthalmic lens of claim 1, wherein the posterior surface is characterized by a bicurve profile.

14. The ophthalmic lens of claim 1, wherein,
  the cornea is characterized by an optical axis; and
  the ophthalmic lens is configured to correct refractive error independent of radial orientation with respect to the optical axis.

15. The ophthalmic lens of claim 1, wherein the inner optic portion and the peripheral portion are configured to allow movement relative to the eye.

16. The ophthalmic lens of claim 1, wherein the inner optic portion is configured to provide one or more lenticular volumes between the posterior surface and the cornea.

17. The ophthalmic lens of claim 1, further comprising a plurality of fenestrations, wherein the plurality of fenestrations is disposed within the inner optic portion, within the peripheral portion, or within both the inner optic portion and the peripheral portion.

18. The ophthalmic lens of claim 17, wherein at least some of the plurality of fenestrations are configured to maintain tear fluid within one or more lenticular volumes between the posterior surface of the inner optic portion and the cornea.

19. The ophthalmic lens of claim 1, wherein,
  the refractive error of the eye comprises astigmatism; and
  the anterior surface of the inner optic portion and the posterior surface of the inner optic portion are radially symmetric.

20. A method for correcting presbyopia of an eye, the eye having a cornea with a refractive shape extending across an optical region of the cornea, the method comprising:
  positioning the ophthalmic lens of claim 1 on the eye so that the inner optic portion of the ophthalmic lens is disposed over the optical region of the cornea.

* * * * *